United States Patent
Nelson et al.

(10) Patent No.: US 10,276,869 B2
(45) Date of Patent: *Apr. 30, 2019

(54) BETA-DELITHIATED LAYERED NICKEL OXIDE ELECTROCHEMICALLY ACTIVE CATHODE MATERIAL AND A BATTERY INCLUDING SAID MATERIAL

(71) Applicant: DURACELL U.S. OPERATIONS, INC., Wilmington, DE (US)

(72) Inventors: Jennifer A. Nelson, Waltham, MA (US); David Lloyd Anglin, Brookfield, CT (US); Mariarosa Brundu, Budduso (IT); Paul Albert Christian, Norton, MA (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/785,326

(22) Filed: Oct. 16, 2017

(65) Prior Publication Data
US 2018/0040894 A1 Feb. 8, 2018

Related U.S. Application Data

(63) Continuation of application No. 14/625,876, filed on Feb. 19, 2015, now Pat. No. 9,793,542.
(Continued)

(51) Int. Cl.
*H01M 4/525* (2010.01)
*H01M 4/24* (2006.01)
(Continued)

(52) U.S. Cl.
CPC ............ *H01M 4/525* (2013.01); *H01M 4/06* (2013.01); *H01M 4/131* (2013.01); *H01M 4/244* (2013.01);
(Continued)

(58) Field of Classification Search
CPC ........ H01M 4/525; H01M 4/06; H01M 4/131; H01M 4/244; H01M 4/32; H01M 4/366;
(Continued)

(56) References Cited

U.S. PATENT DOCUMENTS 2,956,860 A 10/1960 Welsch et al.
3,437,435 A 4/1969 Moore et al.
(Continued)

FOREIGN PATENT DOCUMENTS

CA 1263697 A 12/1989
EP 0702421 A1 3/1996
(Continued)

OTHER PUBLICATIONS

PCT International Search Report with Written Opinion in corresponding International Application No. PCT/US2015/021381, dated Aug. 11, 2015.
(Continued)

*Primary Examiner* — Stewart A Fraser
*Assistant Examiner* — Rachel L Zhang
(74) *Attorney, Agent, or Firm* — Marshall, Gerstein & Borun LLP

(57) ABSTRACT

The invention is directed towards an electrochemically active cathode material. The electrochemically active cathode includes beta-delithiated layered nickel oxide. The beta-delithiated layered nickel oxide has an X-ray diffraction pattern. The X-ray diffraction pattern of the beta-delithiated layered nickel oxide includes a first peak from about 14.9°2θ to about 16.0°2θ; a second peak from about 21.3°2θ to about 22.7°2θ; a third peak from about 37.1°2θ to about 37.4°2θ; a fourth peak from about 43.2°2θ to about 44.0°2θ; a fifth peak from about 59.6°2θ to about 60.6°2θ; and a sixth peak from about 65.4°2θ to about 65.9°2θ.

18 Claims, 3 Drawing Sheets

US 10,276,869 B2
Page 2

Related U.S. Application Data

(60) Provisional application No. 61/971,667, filed on Mar. 28, 2014.

(51) Int. Cl.
| | |
|---|---|
| *H01M 4/32* | (2006.01) |
| *H01M 4/36* | (2006.01) |
| *H01M 4/06* | (2006.01) |
| *H01M 4/52* | (2010.01) |
| *H01M 6/04* | (2006.01) |
| *H01M 6/50* | (2006.01) |
| *H01M 10/30* | (2006.01) |
| *H01M 10/48* | (2006.01) |
| *H01M 4/131* | (2010.01) |
| *H01M 4/38* | (2006.01) |
| *H01M 4/02* | (2006.01) |
| *F02M 51/02* | (2006.01) |

(52) U.S. Cl.
CPC ............ *H01M 4/32* (2013.01); *H01M 4/366* (2013.01); *H01M 4/38* (2013.01); *H01M 4/52* (2013.01); *H01M 6/04* (2013.01); *H01M 6/505* (2013.01); *H01M 6/5083* (2013.01); *H01M 10/30* (2013.01); *H01M 10/488* (2013.01); *F02M 51/02* (2013.01); *H01M 2004/021* (2013.01); *H01M 2300/0085* (2013.01)

(58) Field of Classification Search
CPC ............ H01M 4/38; H01M 4/52; H01M 6/04; H01M 6/505; H01M 6/5083; H01M 10/30; H01M 10/488
See application file for complete search history.

(56) References Cited

U.S. PATENT DOCUMENTS

| | | | |
|---|---|---|---|
| 3,520,729 A | 7/1970 | Voss et al. | |
| 4,136,236 A | 1/1979 | Ruetschi | |
| 4,192,914 A | 3/1980 | Ruetschi | |
| 4,246,253 A | 1/1981 | Hunter | |
| 4,312,930 A | 1/1982 | Hunter | |
| 4,383,029 A | 5/1983 | Yamada et al. | |
| 4,451,543 A | 5/1984 | Dzieciuch et al. | |
| 4,777,100 A | 10/1988 | Chalilpoyil et al. | |
| 4,959,282 A | 9/1990 | Dahn et al. | |
| 5,277,890 A | 1/1994 | Wang et al. | |
| 5,283,139 A | 2/1994 | Newman et al. | |
| 5,348,726 A | 9/1994 | Wang et al. | |
| 5,391,365 A | 2/1995 | Wang et al. | |
| 5,425,932 A | 6/1995 | Tarascon | |
| 5,482,796 A | 1/1996 | Wang et al. | |
| 5,532,084 A | 7/1996 | Wang et al. | |
| 5,587,133 A | 12/1996 | Amatucci et al. | |
| 5,626,988 A | 5/1997 | Daniel-Ivad et al. | |
| 5,720,932 A | 2/1998 | Amine et al. | |
| 5,759,510 A | 6/1998 | Pillai | |
| 5,772,890 A | 6/1998 | Hubred | |
| 5,783,334 A | 7/1998 | Yasuda | |
| 5,798,180 A | 8/1998 | Chowdhury et al. | |
| 5,910,366 A | 6/1999 | Chowdhury et al. | |
| 5,952,124 A | 9/1999 | Kainthla et al. | |
| 5,955,052 A | 9/1999 | Padhi et al. | |
| 6,054,234 A | 4/2000 | Weiss et al. | |
| 6,074,784 A | 6/2000 | Maruta | |
| 6,162,561 A | 12/2000 | Wang et al. | |
| 6,265,105 B1 | 7/2001 | Tokuda et al. | |
| 6,270,921 B1 | 8/2001 | Kaplan et al. | |
| 6,284,410 B1 | 9/2001 | Durkot et al. | |
| 6,334,993 B1 | 1/2002 | Suita et al. | |
| 6,335,119 B1 | 1/2002 | Maruta | |
| 6,428,766 B1 | 8/2002 | Fujino et al. | |
| 6,444,364 B1 | 9/2002 | Harris et al. | |
| 6,472,103 B1 | 10/2002 | Durkot et al. | |
| 6,492,062 B1 | 12/2002 | Wang et al. | |
| 6,509,117 B1 | 1/2003 | Bowden et al. | |
| 6,521,378 B2 | 2/2003 | Durkot et al. | |
| 6,566,009 B1 | 5/2003 | Noya et al. | |
| 6,589,693 B1 | 7/2003 | Kilby et al. | |
| 6,617,072 B2 | 9/2003 | Venkatesan et al. | |
| 6,620,550 B2 | 9/2003 | Christian et al. | |
| 6,667,131 B1 | 12/2003 | Vitins et al. | |
| 6,753,109 B2 | 6/2004 | Nanjundaswamy et al. | |
| 6,759,166 B2 | 7/2004 | Wang et al. | |
| 6,783,893 B2 | 8/2004 | Bowden et al. | |
| 6,794,082 B2 | 9/2004 | Mori et al. | |
| 6,818,347 B1 | 11/2004 | Jin et al. | |
| 6,858,349 B1 | 2/2005 | Luo et al. | |
| 6,932,846 B2 | 8/2005 | Bowden et al. | |
| 6,936,378 B2 | 8/2005 | Randell | |
| 6,991,875 B2 | 1/2006 | Christian et al. | |
| 7,045,247 B1 | 5/2006 | Copeland et al. | |
| 7,045,252 B2 | 5/2006 | Christian et al. | |
| 7,081,319 B2 | 7/2006 | Christian et al. | |
| 7,232,628 B2 | 6/2007 | Randell | |
| 7,247,407 B2 | 7/2007 | Durkot et al. | |
| 7,273,680 B2 | 9/2007 | Durkot et al. | |
| 7,314,681 B2 | 1/2008 | Randell et al. | |
| 7,407,521 B2 | 8/2008 | Shimakawa et al. | |
| 7,407,726 B2 | 8/2008 | Wang et al. | |
| 7,435,395 B2 | 10/2008 | Durkot et al. | |
| 7,569,306 B2 | 8/2009 | Kato et al. | |
| 7,763,383 B2 | 7/2010 | Miyamoto et al. | |
| 7,767,336 B2 | 8/2010 | Ito et al. | |
| 7,807,297 B2 | 10/2010 | Anglin et al. | |
| 8,003,254 B2 | 8/2011 | Bofinger et al. | |
| 8,133,615 B2 | 3/2012 | Johnson | |
| 8,303,840 B2 | 11/2012 | Nanjundaswamy et al. | |
| 8,318,350 B2 | 11/2012 | Johnson | |
| 8,691,439 B2 | 4/2014 | Ndzebet et al. | |
| 8,872,963 B2 | 10/2014 | Omata et al. | |
| 8,920,969 B2 * | 12/2014 | Issaev ................ H01M 10/488 |
| | | | 429/206 |
| 2002/0172867 A1 | 11/2002 | Anglin | |
| 2003/0068549 A1 | 4/2003 | Daniel-Ivad et al. | |
| 2004/0009400 A1 | 1/2004 | Yamaguchi et al. | |
| 2005/0079424 A1 | 4/2005 | Davis et al. | |
| 2005/0152830 A1 | 7/2005 | Yasutomi et al. | |
| 2005/0164086 A1 | 7/2005 | Bofinger et al. | |
| 2005/0221181 A1 | 10/2005 | Durkot et al. | |
| 2007/0015054 A1 | 1/2007 | Nunome et al. | |
| 2007/0248879 A1 | 10/2007 | Durkot et al. | |
| 2008/0008937 A1 | 1/2008 | Eylem et al. | |
| 2008/0171266 A1 | 7/2008 | Kato et al. | |
| 2008/0193487 A1 | 8/2008 | Schild et al. | |
| 2008/0193847 A1 | 8/2008 | Suetsugu et al. | |
| 2008/0241683 A1 | 10/2008 | Fensore et al. | |
| 2008/0274405 A1 | 11/2008 | Kobayashi et al. | |
| 2009/0047578 A1 | 2/2009 | Iwamoto et al. | |
| 2009/0162745 A1 | 6/2009 | Iwamoto et al. | |
| 2009/0249614 A1 | 10/2009 | Davis et al. | |
| 2009/0258297 A1 | 10/2009 | Davis et al. | |
| 2010/0003596 A1 | 1/2010 | Sato et al. | |
| 2011/0151329 A1 | 6/2011 | Bernard et al. | |
| 2011/0219607 A1 | 9/2011 | Nanjundaswamy et al. | |
| 2011/0223477 A1 | 9/2011 | Nelson et al. | |
| 2011/0223493 A1 | 9/2011 | Christian et al. | |
| 2013/0065112 A1 | 3/2013 | Uzuka et al. | |
| 2013/0247363 A1 | 9/2013 | Nelson et al. | |
| 2013/0248758 A1 | 9/2013 | Park et al. | |
| 2015/0280234 A1 | 10/2015 | Nelson et al. | |
| 2015/0280250 A1 | 10/2015 | Anglin et al. | |
| 2018/0040895 A1 | 2/2018 | Anglin et al. | |

FOREIGN PATENT DOCUMENTS

| | | |
|---|---|---|
| JP | H06511106 A | 12/1994 |
| JP | H08250121 A | 9/1996 |
| JP | H11139830 A | 5/1999 |
| JP | 2001332259 A | 11/2001 |
| JP | 2003151549 A | 5/2003 |

(56) References Cited

FOREIGN PATENT DOCUMENTS

| JP | 2004323331 A | 11/2004 |
|---|---|---|
| JP | 2005322551 A | 11/2005 |
| JP | 2005332691 A | 12/2005 |
| JP | 2007026896 A | 2/2007 |
| WO | WO-93/06474 A1 | 4/1993 |
| WO | WO-2009082862 A1 | 7/2009 |
| WO | WO-2010/023531 A2 | 3/2010 |
| WO | WO-2016/160659 A1 | 10/2016 |

OTHER PUBLICATIONS

Abbas, et al. "Hydroxyl as a Defect of the Manganese Dioxide Lattice and its Applications to the Dry Cell Battery." *Journal of Power Sources* 58, No. 1 (1996): 15-21.

Alcantara, et al. "Structure and Electrochemical Properties of $Li_{1-x}(Ni_yCo_{1-y})_{1+x}O_2$ Effect of Chemical Delithiation at 0° C." *Journal of the Electrochemical Society* 142, No. 12 (1995): 3997-4005.

Ammundsen, et al. "Effect of Chemical Extraction of Lithium on the Local Structure of Spinel Lithium Manganese Oxides Determined by X-ray Absorption Spectroscopy." *Chemistry of Materials* 8, No. 12 (1996): 2799-2808.

Ammundsen, et al. "Mechanism of Proton Insertion and Characterization of the Proton Sites in Lithium Manganate Spinels." *Chemistry of Materials* 7, No. 11 (1995): 2151-2160.

Arai, et al. "Characteristics of $Li_x NiO_2$ Obtained by Chemical Delithiation." *Journal of Power Sources* 81 (1999): 401-405.

Arai, et al., "Lithium Nickelate With Cadmium Iodide Structure." *Materials Research Society Proceedings, Library Archive* 575 (2000): 3-7.

Arai, et al. "Nickel Dioxide Polymorphs as Lithium Insertion Electrodes." *Electrochimica Acta* 47, No. 17 (2002): 2697-2705.

Arai, et al. "Structural and Thermal Characteristics of Nickel Dioxide Derived from $LiNiO_2$." *Journal of Solid State Chemistry* 163, No. 1 (2002): 340-349.

Arai, et al. "Synthesis and Electrode Performance of Layered Nickel Dioxide Containing Alkaline Ions." *Electrochimica Acta* 50, No. 9 (2005): 1821-1828.

Ariza, et al. "Probing the Local Structure and the Role of Protons in Lithium Sorption Processes of a New Lithium-Rich Manganese Oxide." *Chemistry of Materials* 18, No. 7 (2006): 1885-1890.

Armstrong, et al. "Demonstrating Oxygen Loss and Associated Structural Reorganization in the Lithium Battery Cathode $Li[Ni_{0.2}Li_{0.2}Mn_{0.6}]O_2$." *Journal of the American Chemical Society* 128, No. 26 (2006): 8694-8698.

Arunkumar, et al., "Chemical and Structural Instability of the Chemically Delithiated (1-z) $Li[Li_{1/3}Mn_{2/3}]O_2$ (z) Li $[Co_{1-y}Ni_y]O_2$ (0≤y≤1 and 0≤z≤1) Solid Solution Cathodes." *Journal of Materials Chemistry* 18, No. 2 (2008): 190-198.

Axmann, et al. "Formation of $Fe^{IV}$ and $Ni^{IV}$ by Electrochemical and Chemical Oxidation of an Iron-Substituted Nickel(II) Hydroxide: The Direct Two-Electron Step $Ni^{II \rightarrow NiIV + 2e-}$." *Angewandte Chemie International Edition in English* 35, No. 10 (1996): 1115-1118.

Axmann, et al. "Nickel Hydroxide as a Matrix for Unusual Valencies: the Electrochemical Behaviour of Metal (III)-Ion-Substituted Nickel Hydroxides of the Pyroaurite Type." *Journal of Alloys and Compounds* 246, No. 1 (1997): 232-241 (abstract only).

Benhaddad, et al. "Reactivity of Nanostructured $MnO_2$ in Alkaline Medium Studied with a Micro-Cavity Electrode: Effect of Synthesizing Temperature." *ACS Applied Materials & Interfaces* 1, No. 2 (2009): 424-432.

Blesa, et al. "A New Route to $\gamma$-$Fe_2O_3$ via an Intermediate Oxyhydroxide. The Reaction of $\alpha$-$NaFeO_2$ with Benzoic Acid." *Journal of Materials Chemistry* 9, No. 1 (1999): 227-231.

Blesa, et al. "Nonstoichiometric Spinel Ferrites Obtained From $\alpha$-$NaFeO_2$ via Molten Media Reactions." *Inorganic Chemistry* 41, No. 23 (2002): 5961-5967. (Abstract only).

Blesa, et al. "$\alpha$-$NaFeO_2$: Ionic Conductivity and Sodium Extraction." *Solid State Ionics* 126, No. 1 (1999): 81-87.

Bolibar, et al. "Synthesis, Characterization and Thermal Decomposition Study of Some Nickelnitro Derivatives." *Journal of Materials Chemistry* 7, No. 11 (1997): 2259-2264.

Cheng, et al. "Facile Controlled Synthesis of $MnO_2$ Nanostructures of Novel Shapes and Their Application in Batteries." *Inorganic Chemistry* 45, No. 5 (2006): 2038-2044.

Chitrakar, et al. "A New Type of Manganese Oxide ($MnO_2$ $0.5H_2O$) Derived from $Li_{1.6}Mn_{1.6}O_4$ and Its Lithium Ion-Sieve Properties." *Chemistry of Materials* 12, No. 10 (2000): 3151-3157.

Choi, et al. "Proton Insertion Into Oxide Cathodes During Chemical Delithiation." *Electrochemical and Solid-State Letters* 9, No. 5 (2006): A241-A244.

Croguennec et al., "Structural characterisation of the Highly Deintercalated $Li_xNi_{1.02}O_2$ Phases (With x≤0.30) Basis of a presentation given at Materials Discussion No. 3, Sep. 26-29, 2000, University of Cambridge, UK." *Journal of Materials Chemistry* 11, No. 1 (2001): 131-141.

Crompton, Battery Reference Book, "Guidelines to battery selection", 3rd ed., Oxford: Reed Educational and Professional Publishing, Ltd. Chapter 2 (2000).

Dahn, et al. "Structure and Electrochemistry of $Li_{1\pm y}NiO_2$ and a New $Li_2 NiO_2$ Phase With the Ni $(OH)_2$ Structure." *Solid State Ionics* 44, No. 1 (1990): 87-97 (abstract only).

Dai et al., "Preparation and Characterization of Nanostructured $MnO_2$ for Lithium Batteries", Proc. 40th Power Sources Conf., pp. 283-286 (2002).

David, et al. "Structure Refinement of the Spinel-Related Phases $Li_2Mn_2O_4$ and $Li_{0.2}Mn_2O_4$." *Journal of Solid State Chemistry* 67, No. 2 (1987): 316-323.

Delmas, et al. "On the Behavior of the $Li_xNiO_2$ System: an Electrochemical and Structural Overview." *Journal of Power Sources* 68, No. 1 (1997): 120-125.

Dominko, et al. "A Novel Coating Technology for Preparation of Cathodes in Li-ion Batteries." *Electrochemical and Solid-State Letters* 4, No. 11 (2001): A187-A190.

Dutta, et al. "Chemical Synthesis and Properties of $Li_{1-\delta-x}Ni_{1+\delta}O_2$ and $Li[Ni_2]O_4$." *Journal of Solid State Chemistry* 96, No. 1 (1992): 123-131.

Ebner, et al. "The $LiNiO_2$/Carbon Lithium-Ion Battery." *Solid State Ionics* 69, No. 3 (1994): 238-256.

Endres, et al. "Extraction of Lithium from Spinel Phases of the System $Li_{1+x}Mn_{2-x}O_{4-\delta}$." *Journal of Power Sources* 69, No. 1 (1997): 145-156.

Fang, et al. "Low-Temperature Synthesis of Highly Crystallized $LiMn_2O_4$ from Alpha Manganese Dioxide Nanorods." *Journal of Power Sources* 184, No. 2 (2008): 494-497.

Feng, et al. "Alkali Metal Ions Insertion/Extraction Reactions with Hollandite-Type Manganese Oxide in the Aqueous Phase." *Chemistry of Materials* 7, No. 1 (1995): 148-153.

Feng, et al. "Synthesis of Hollandite-Type Manganese Dioxide with $H^+$ Form for Lithium Rechargeable Battery." *Journal of the Electrochemical Society* 141, No. 10 (1994): L135-L136.

Feng et al. "$Li^+$ Extraction/Insertion with Spinel-Type Lithium Manganese Oxides. Characterization of Redox-Type and Ion-Exchange-Type Sites", Langmuir 8:1861-1867 (1992).

Fong, et al. "A Powder Neutron Diffraction Study of $\lambda$ and $\gamma$ Manganese Dioxide and of $LiMn_2O_4$." *Zeitschrift Fuer Kristallographie* 209, No. 12 (1994): 941-945.

Franger, et al. "Development of New Low Temperature Manganese Oxides as Lithium Insertion Compounds." *Recent Research Developments Solid State Ionics* 3 (2006): 1-22. (abstract only).

Gao, et al. "Synthesis and Characterization of $Li_{1+x}Mn_{2-x} O_4$ for Li-Ion Battery Applications." *Journal of the Electrochemical Society* 143, No. 1 (1996): 100-114.

Gummow, et al. "Improved Capacity Retention in Rechargeable 4 V Lithium/Lithium-Manganese Oxide (Spinel) Cells." *Solid State Ionics* 69, No. 1 (1994): 59-67.

Han, et al, "Pure Tetravalent Nickel in $\gamma$-Type Nickel Oxyhydroxide as Secondary Battery Electrode." *Journal of Materials Research* 13, No. 4 (1998):880-882.

Hill, et al. "Electrochemical Synthesis of Beta- and Gamma-Manganese Dioxides Under Hydrothermal Conditions." *Electrochemical and Solid-State Letters* 4, No. 6 (2001): D1-D3.

(56) References Cited

OTHER PUBLICATIONS

Hunter, et al. "Nonaqueous Electrochemistry of Lambda $MnO_2$." *Proc. Electrochem. Soc* 85 (1984): 4.

Hunter, et al. "Preparation of a New Crystal Form of Manganese Dioxide: $\lambda$-$MnO_2$." *Journal of Solid State Chemistry* 39, No. 2 (1981): 142-147.

Ji, et al. "Simple Fabrication of Nano-Sized $NiO_2$ Powder and its Application to Oxidation Reactions." *Applied Catalysis A: General* 282, No. 1 (2005): 25-30. (Abstract only).

Kanoh, et al. "In Situ Raman Spectroscopic Study on Electroinsertion of $Li^+$ into a Pt/$\lambda$-$MnO_2$ Electrode in Aqueous Solution." *Electrochemical and Solid-State Letters* 1, No. 1 (1998): 17-19.

Kanoh, et al. "Selective Electroinsertion of Lithium Ions Into a Pt/$\lambda$-$MnO_2$ Electrode in the Aqueous Phase." *Langmuir* 7, No. 9 (1991): 1841-1842.

Kanzaki, et al. "Mechanism of Lithium Ion Insertion into $\lambda$-$MnO_2$." *Journal of the Electrochemical Society* 138, No. 1 (1991): 333-334.

Kao, et al. "Phase Transformation of Gamma-EMD to Beta Manganese Dioxide During Digestion in Sulfuric Acid." *Journal of the Electrochemical Society* 134, No. 6 (1987): 1321-1325.

Kijima, et al. "Preparation and Characterization of Open Tunnel Oxide $\alpha$-$MnO_2$ Precipitated by Ozone Oxidation." *Journal of Solid State Chemistry* 159, No. 1 (2001): 94-102.

Kim, et al. "Direct Carbon-Black Coating on $LiCoO_2$ Cathode Using Surfactant for High-Density Li-Ion Cell." *Journal of Power Sources* 139, No. 1 (2005): 289-294.

Komaba, et al. "Preparation and Electrochemical Performance of Composite Oxide of Alpha Manganese Dioxide and Li—Mn—O Spinel." *Electrochimica Acta* 50, No. 11 (2005): 2297-2305.

Komaba, et al. "Synthesis of Layered $MnO_2$ by Calcination of $KMnO_4$ for Rechargeable Lithium Battery Cathode." *Electrochimica Acta* 46, No. 1 (2000): 31-37.

Kosova, et al. "Comparative Study of $LiCoO_2$ Surface Modified with Different Oxides." *Journal of Power Sources* 174, No. 2 (2007): 959-964.

Kozawa. "Formation of Manganate and Permanganate Ions from Manganese-Dioxide in Aqueous Solution." *Journal Electrochemical Society of Japan* 44, No. 8 (1976): 508-513.

Lander, et al. "Barium-Nickel Oxides with Tri- and Tetravalent Nickel." *Journal of the American Chemical Society* 73, No. 6 (1951): 2452-2454.

Larcher, et al. "Synthesis of $MnO_2$ Phases from $LiMn_2O_4$ in Aqueous Acidic Media Mechanisms of Phase Transformations, Reactivity, and Effect of Bi Species." *Journal of the Electrochemical Society* 145, No. 10 (1998): 3392-3400.

Lavela, et al. "Chemical Delithiation, Thermal Transformations and Electrochemical Behaviour of Iron-Substituted Lithium Nickelate." In *Materials Research Society Symposium Proceedings*, vol. 658, pp. GG9-7. Cambridge University Press, 2000. (Abstract only).

Lavela, et al. "Effects of Partial Acid Delithiation on the Electrochemical Lithium Insertion Properties of Nickel-Stabilized $LiMn_2O_4$ Spinel Oxides." *Journal of Solid State Chemistry* 150, No. 1 (2000): 196-203.

Li, et al., "Electrocatalytic Activities of $LiCo_{1-y}M_yO_2$ (M=Ni or Fe) Synthesized at Low Temperature and Acid-Delithiated Products for Oxygen Evolution/Reduction in Alkaline Solution." *Electrochimica Acta* 46, No. 5 (2001): 717-722.

Linden and T. B. Rebby, *Handbook of Batteries*, New York: McGraw-Hill Co., Inc. (1995) "1.4 Classification of Cells and Batteries," pp. 1.9-1.11; "7.1 General Characteristics and Applications of Primary Batteries," pp. 7.3-7.7; "11/13 Lithium/Bismuth Oxide Cells," pp. 11-79 to 11-81; Chapter 12, "Silver Oxide Cells," pp. 12.1-12-16; "23.1 General Characteristics and Applications of Secondary Batteries," pp. 23.3-23.12.

Liu, et al. "Preparation and Alkali-Metal Ion Extraction/Insertion Reactions with Nanofibrous Manganese Oxide Having 2 × 4 Tunnel Structure." *Chemistry of Materials* 15, No. 19 (2003): 3696-3703.

Lu, et al. "Characterization of Structure and Electrochemical Properties of Lithium Manganese Oxides for Lithium Secondary Batteries Hydrothermally Synthesized from $\delta$-$K_xMnO_2$." *Electrochimica Acta* 49, No. 14 (2004): 2361-2367.

Lubin, et al. "Chemical Lithium Extraction from Manganese Oxides for Lithium Rechargeable Batteries." *Journal of Power Sources* 34, No. 2 (1991): 161-173.

Maruta, et al. "Low-Temperature Synthesis of Lithium Nickelate Positive Active Material from Nickel Hydroxide for Lithium Cells." *Journal of Power Sources* 90, No. 1 (2000): 89-94.

Morales, et al. "Acid-Delithiated $Li_{1-x(Niy}Co_{1-y})_{1+x}O_2$ as Insertion Electrodes in Lithium Batteries." *Journal of Solid State Chemistry* 113, No. 1 (1994): 182-192. (Abstract only).

Morales, et al. "Cation Distribution and Chemical Deintercalation of $Li_{1-x}Ni_{1+x}O_2$." *Materials Research Bulletin* 25, No. 5 (1990): 623-630.

Morales, et al. "Thermal Behaviour of Chemically Deintercalated $Li_{1-1}Ni_{1+x}O_2$." *Journal of Thermal Analysis* 38, No. 3 (1992): 295-301. (Abstract only).

Mosbah, et al. "Phases $Li_xMnO_2\lambda$ Rattachees au Type Spinelle." *Materials Research Bulletin* 18, No. 11 (1983): 1375-1381.

Motohashi, et al. "Synthesis and Properties of $CoO_2$, the x=0 End Member of the $Li_xCoO2$ and $Na_xCoO_2$ Systems." *Chemistry of Materials* 19, No. 21 (2007): 5063-5066.

Mukai, et al., "Structural and Magnetic Nature for Fully Delithiated $Li_xNiO_2$: Comparative Study Between Chemically and Electrochemically Prepared Samples." The Journal of Physical Chemistry C 114, No. 18 (2010): 8626-8632.

Nishimura, et al., "Manganese Dioxide Particles Produced by Ozonation in Acidic Manganese Sulfate Solutions." *Shigen-to-Sozai*. 107 (1991): 805-810.

Ohzuku, et al. "Electrochemistry and Structural Chemistry of $LiNiO_2$ ($R\bar{3}m$) for 4 Volt Secondary Lithium Cells." *Journal of the Electrochemical Society* 140, No. 7 (1993): 1862-1870.

Ohzuku, et al. "Electrochemistry of Manganese Dioxide in Lithium Nonaqueous Cell III. X-Ray Diffractional Study on the Reduction of Spinel-Related Manganese Dioxide." *Journal of the Electrochemical Society* 137, No. 3 (1990): 769-775.

Ooi, et al. "Lithium-Ion Insertion/Extraction Reaction with $\lambda$-$MnO_2$ in the Aqueous Phase." *Chemistry Letters* 17, No. 6 (1988): 989-992.

Ooi, et al. "Mechanism of Lithium (1+) Insertion in Spinel-Type Manganese Oxide. Redox and Ion-Exchange Reactions." *Langmuir* 7, No. 6 (1991): 1167-1171.

Oesten, et al., "Structural Aspects of Undoped and Doped Nickel Hydroxides." *Ionics* 2, No. 3 (1996): 293-301.

Palacin, et al. "Low-Temperature Synthesis of $LiNiO_2$ Reaction Mechanism, Stability, and Electrochemical Properties." *Journal of the Electrochemical Society* 144, No. 12 (1997): 4226-4236.

Patrice, et al. "Understanding the Second Electron Discharge Plateau in $MnO_2$-Based Alkaline Cells." *Journal of the Electrochemical Society* 148, No. 5 (2001): A448-A455.

Puckhaber, et al. "Particle Sizing-Laser Diffraction: Millennium-Link for Particle Size Analysis." *Powder Handling and Processing* 11, No. 1 (1999): 91-95.

Rao, et al., "Electrochemical Behaviour of Solid Lithium Nickelate ($LiNiO_2$) in an Aqueous Electrolyte System." *Journal of Solid State Electrochemistry* 4 (1999): 17-23.

Read, et al. "Low Temperature Performance of $\lambda$ $MnO_2$ in Lithium Primary Batteries." *Electrochemical and Solid-State Letters* 4, No. 10 (2001): A162-A165.

Rossouw, et al. "Alpha Manganese Dioxide for Lithium Batteries: a Structural and Electrochemical Study." *Materials Research Bulletin* 27, No. 2 (1992): 221-230.

Schilling, et al. "Thermodynamic Stability of Chemically Delithiated Li ($Li_xMn_{2-x}$) $O_4$." *Journal of the Electrochemical Society* 145, No. 2 (1998): 569-575.

Schilling, et al. "Modification of the High-Rate Discharge Behavior of Zn-$MnO_2$ Alkaline Cells Through the Addition of Metal Oxides to the Cathode." *ITE Letters on Batteries*, New Technologies & Medicine 2, No. 3 (2001):341-348.

Shen, et al. "Phase Transitions and Ion Exchange Behavior of Electrolytically Prepared Manganese Dioxide." *Journal of Solid State Chemistry* 64, No. 3 (1986): 270-282.

(56) References Cited

OTHER PUBLICATIONS

Stoyanova, et al. "Effect of Mn-Substitution for Co on the Crystal Structure and Acid Delithiation of $LiMn_yCo_{1-y}O_2$ Solid Solutions." *Solid State Ionics* 73, No. 3-4 (1994): 233-240.

Stoyanova, et al. "New Data on Chemical Delithiation of $Li_xNi_{2-x}O_2$ (0.6<x<1)." *Journal of Solid State Chemistry* 108, No. 2 (1994): 211-218.

Sun, et al. "Low Temperature Synthesis of Layered $LiNiO_2$ Cathode Material in Air Atmosphere by Ion Exchange Reaction." *Solid State Ionics* 177, No. 13 (2006): 1173-1177.

Takeda, et al. "Crystal Chemistry and Physical Properties of $La_{2-x}Sr_xNiO_4$ (0≤x≤1.6)." *Materials Research Bulletin* 25, No. 3 (1990): 293-306.

Tang, et al. "Lithium Ion Extraction from Orthorhombic $LiMnO_2$ in Ammonium Peroxodisulfate Solutions." *Journal of Solid State Chemistry* 142, No. 1 (1999): 19-28.

Tang, et al. "Preparation of Plate-Form Manganese Oxide by Selective Lithium Extraction from Monoclinic $Li_2MnO_3$ under Hydrothermal Conditions." *Chemistry of Materials* 12, No. 11 (2000): 3271-3279.

Tessier, et al., "Structural and Textural Evolution of Zinc-Substituted Nickel Hydroxide Electrode Materials Upon Ageing in KOH and Upon Redox Cycling." *Solid State Ionics* 133, No. 1 (2000): 11-23.

Thackeray. "Manganese Oxides for Lithium Batteries." *Progress in Solid State Chemistry* 25, No. 1 (1997): 1-71.

Venkatraman, et al. "Factors Influencing the Chemical Lithium Extraction Rate from Layered $LiNi_{1-y-z}Co_yMnzO_2$ Cathodes." *Electrochemistry Communications* 6, No. 8 (2004): 832-837.

Venkatraman, et al., "Investigation of the Possible Incorporation of Protons into Oxide Cathodes During Chemical Delithiation." *Journal of Solid State Chemistry* 177, No. 11 (2004): 4244-4250.

Walanda, et al. Hydrothermal $MnO_2$: Synthesis, Structure, Morphology and Discharge Performance. *Journal of Power Sources* 139, No. 4 (2005): 325-341.

Wang, et al. "Selected-Control Hydrothermal Synthesis of α- and β-$MnO_2$ Single Crystal Nanowires." *Journal of the American Chemical Society* 124, No. 12 (2002): 2880-2881.

Wang, et al. "A Novel Chemically Synthesized Manganese Dioxide—Its Preparation and Structural Characterization." *Progress in Batteries and Battery Materials* 17 (1998): 222-231.

Xia et al. "Study on the electrochemical performance of λ-$MnO_2$ in alkaline solution", *Dianyuan Jishu*, vol. 23(Suppl.):74-76 (1999)(abstract only).

Yang, et al., "Highly Swollen Layered Nickel Oxide With a Trilayer Hydrate Structure." *Chemistry of Materials* 20, No. 2 (2007): 479-485.

Yang, et al. "Synthesis of $Li_{1.33}Mn_{1.67}O_4$ Spinels with Different Morphologies and Their Ion Adsorptivities After Delithiation." *Journal of Materials Chemistry* 10, No. 8 (2000): 1903-1909.

Yin, et al. "X-ray/Neutron Diffraction and Electrochemical Studies of Lithium De/Re-Intercalation in $Li_{1-x}Co_{1/3}Ni_{1/3}Mn_{1/3}O_2$ (X=0 → 1)." *Chemistry of Materials* 18, No. 7 (2006): 1901-1910.

Zhecheva, et al. "New Phases Obtained by Acid Delithiation of Layered $LiMO_2$ (M=Co, Ni)." In *Materials Science Forum*, vol. 152, pp. 259-262. Trans Tech Publications, 1994.

European patent application No. 15717992.0, Communication Pursuant to Article 94(3) EPC, dated Mar. 7, 2018.

Japanese Patent Application No. 2017-502756, Notification of Reason for Rejection, dated Feb. 5, 2019.

\* cited by examiner

BETA-DELITHIATED LAYERED NICKEL OXIDE ELECTROCHEMICALLY ACTIVE CATHODE MATERIAL AND A BATTERY INCLUDING SAID MATERIAL

CROSS-REFERENCE TO RELATED APPLICATION

This application is a continuation of U.S. patent application Ser. No. 14/625,876, filed Feb. 19, 2015, which claims the benefit under 35 U.S.C. § 119(e) of U.S. provisional patent application Ser. No. 61/971,667, filed Mar. 28, 2014, the entire disclosure of which is incorporated herein by reference, is hereby claimed.

FIELD OF THE INVENTION

The invention relates to an electrochemically active cathode material and, more specifically, relates to a beta-delithiated layered nickel oxide electrochemically active cathode material.

BACKGROUND OF THE INVENTION

Electrochemical cells, or batteries, are commonly used as electrical energy sources. A battery contains a negative electrode, typically called the anode, and a positive electrode, typically called the cathode. The anode contains an electrochemically active anode material that can be oxidized. The cathode contains an electrochemically active cathode material that can be reduced. The electrochemically active anode material is capable of reducing the electrochemically active cathode material. A separator is disposed between the anode and the cathode. The battery components are disposed in a can, or housing, that is typically made from metal.

When a battery is used as an electrical energy source in an electronic device, electrical contact is made to the anode and the cathode, allowing electrons to flow through the device and permitting the respective oxidation and reduction reactions to occur to provide electrical power to the electronic device. An electrolyte is in contact with the anode, the cathode, and the separator. The electrolyte contains ions that flow through the separator between the anode and cathode to maintain charge balance throughout the battery during discharge.

There is a growing need to make batteries that are better suited to power contemporary electronic devices such as toys; remote controls; audio devices; flashlights; digital cameras and peripheral photography equipment; electronic games; toothbrushes; radios; and clocks. To meet this need, batteries may include higher loading of electrochemically active anode and/or cathode materials to provide increased capacity and service life. Batteries, however, also come in common sizes, such as the AA, AAA, AAAA, C, and D battery sizes, that have fixed external dimensions and constrained internal volumes. The ability to increase electrochemically active material loading alone to achieve better performing batteries is thus limited.

The electrochemically active cathode material of the battery is another design feature that may be adjusted in order to provide increased performance. For example, electrochemically active material that has higher volumetric and gravimetric capacity may result in a better performing battery. Similarly, electrochemically active material that has a higher oxidation state may also result in a better performing battery. The electrochemically active material that is selected, however, must provide an acceptable closed circuit voltage, or running voltage, range for the devices that the battery may power. The device may be damaged if the OCV or running voltages of the battery are too high. Conversely, the device may not function at all if the running voltage of the battery is too low. In addition, electrochemically active material, such as high oxidation state transition metal oxide, may be highly reactive. The highly reactive nature of such electrochemically active material may lead to gas evolution when the electrochemically active material is incorporated within a battery and is brought into contact with the electrolyte. Any gas that is evolved may lead to structural issues within the battery, such as continuity within the cathode, and/or leakage of electrolyte from the battery. The high oxidation state transition metal oxide may detrimentally react with other battery components, such as carbon additives, e.g., graphite; other additives, e.g., surfactant(s); and/or the separator. The high oxidation state transition metal oxide may also have a tendency to consume electrolyte, which may lead to other structural issues within the battery, such as cathode swelling, and unfavorable water balance within the battery. Also, a battery including high oxidation state transition metal oxide as an electrochemically active cathode material may, for example, exhibit instability and an elevated rate of self-discharge when the battery is stored for a period of time.

There exists a need to provide an electrochemically active cathode material for a battery that address the needs discussed above. The beta-delithiated layered nickel oxide electrochemically active cathode material of the present invention addresses, inter alia, these needs.

SUMMARY OF THE INVENTION

In one embodiment, the invention is directed towards an electrochemically active cathode material. The electrochemically active cathode includes a beta-delithiated layered nickel oxide. The beta-delithiated layered nickel oxide has an X-ray diffraction pattern. The X-ray diffraction pattern of the beta-delithiated layered nickel oxide includes a first peak from about 14.9°2θ to about 16.0°2θ; a second peak from about 21.3°2θ to about 22.7°2θ; a third peak from about 37.1°2θ to about 37.4°2θ; a fourth peak from about 43.2°2θ to about 44.0°2θ; a fifth peak from about 59.6°2θ to about 60.6°2θ; and a sixth peak from about 65.4°2θ to about 65.9°2θ.

In another embodiment, the invention is directed toward a battery. The battery includes a cathode; an anode; a separator between the anode and the cathode; and an electrolyte. The cathode includes a conductive additive and an electrochemically active cathode material. The electrochemically active cathode material includes a beta-delithiated layered nickel oxide. The anode includes an electrochemically active anode material. The electrochemically active anode material includes zinc. The beta-delithiated layered nickel oxide has an X-ray diffraction pattern. The X-ray diffraction pattern of the beta-delithiated layered nickel oxide includes a first peak from about 14.9°2θ to about 16.0°2θ; a second peak from about 21.3°2θ to about 22.7°2θ; a third peak from about 37.1°2θ to about 37.4°2θ; a fourth peak from about 43.2°2θ to about 44.0°2θ; a fifth peak from about 59.6°2θ to about 60.6°2θ; and a sixth peak from about 65.4°2θ to about 65.9°2θ.

BRIEF DESCRIPTION OF THE DRAWINGS

While the specification concludes with claims particularly pointing out and distinctly claiming the subject matter, which is regarded as forming the present invention, it is believed that the invention will be better understood from the following description taken in conjunction with the accompanying drawings.

DETAILED DESCRIPTION OF THE INVENTION

Electrochemical cells, or batteries, may be primary or secondary. Primary batteries are meant to be discharged, e.g., to exhaustion, only once and then discarded. Primary batteries are described, for example, in David Linden, *Handbook of Batteries* ($4^{th}$ ed. 2011). Secondary batteries are intended to be recharged. Secondary batteries may be discharged and recharged many times, e.g., more than fifty times, a hundred times, or more. Secondary batteries are described, for example, in David Linden, *Handbook of Batteries* ($4^{th}$ ed. 2011). Accordingly, batteries may include various electrochemical couples and electrolyte combinations. Although the description and examples provided herein are generally directed towards primary alkaline electrochemical cells, or batteries, it should be appreciated that the invention applies to both primary and secondary batteries of aqueous, nonaqueous, ionic liquid, and solid state systems. Primary and secondary batteries of the aforementioned systems are thus within the scope of this application and the invention is not limited to any particular embodiment.

Figure 1:
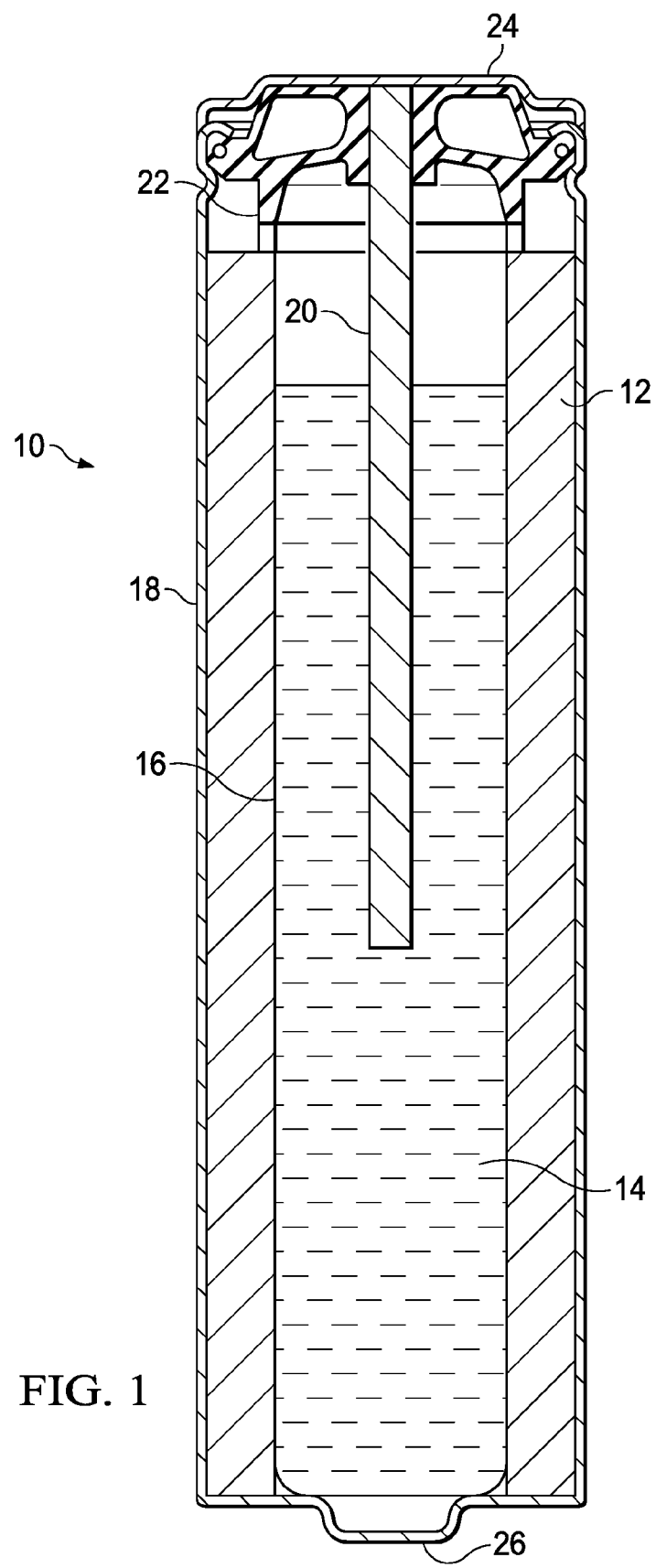
FIG. 1 is a cross-section of a primary alkaline battery including an embodiment of the beta-delithiated layered nickel oxide electrochemically active cathode material of the present invention.

Referring to FIG. 1, there is shown a primary alkaline electrochemical cell, or battery, 10 including a cathode 12, an anode 14, a separator 16, and a housing 18. Battery 10 also includes current collector 20, seal 22, and an end cap 24. The end cap 24 serves as the negative terminal of the battery 10. A positive pip 26 is at the opposite end of the battery 10 from the end cap 24. The positive pip 26 may serve as the positive terminal of the battery 10. An electrolytic solution is dispersed throughout the battery 10. The cathode 12, anode 14, separator 16, electrolyte, current collector 20, and seal 22 are contained within the housing 18. Battery 10 can be, for example, a AA, AAA, AAAA, C, or D alkaline battery.

The housing 18 can be of any conventional type of housing commonly used in primary alkaline batteries and can be made of any suitable base material, for example cold-rolled steel or nickel-plated cold-rolled steel. The housing 18 may have a cylindrical shape. The housing 18 may be of any other suitable, non-cylindrical shape. The housing 18, for example, may have a shape comprising at least two parallel plates, such as a rectangular, square, or prismatic shape. The housing 18 may be, for example, deep-drawn from a sheet of the base material, such as cold-rolled steel or nickel-plated steel. The housing 18 may be, for example, drawn into a cylindrical shape. The housing 18 may have at least one open end. The housing 18 may have a closed end and an open end with a sidewall therebetween. The interior surface of the sidewall of the housing 18 may be treated with a material that provides a low electrical-contact resistance between the interior surface of the sidewall of the housing 18 and an electrode, such as the cathode 12. The interior surface of the sidewall of the housing 18 may be plated, e.g., with nickel, cobalt, and/or painted with a carbon-loaded paint to decrease contact resistance between, for example, the internal surface of the sidewall of the housing 18 and the cathode 12.

The cathode 12 includes at least one electrochemically active cathode material. The electrochemically active cathode material may be a beta-delithiated layered nickel oxide. The beta-delithiated layered nickel oxide may have the general chemical formula $Li_xA_yNi_{1+a-z}M_zO_2 \cdot nH_2O$ where x is from about 0.02 to about 0.20; y is from about 0.03 to about 0.20; a is from about 0 to about 0.2; z is from about 0 to about 0.2; n is from about 0 to about 1; A comprises an alkali metal; and M comprises an alkaline earth metal, a transition metal, a non-transition metal, and any combination thereof.

Elements from Group 1A of the Periodic Table of Elements are commonly referred to as alkali metals. The alkali metal may include an element, or any combination of elements, from Group 1A of the Periodic Table of Elements. The alkali metal may comprise, for example, potassium (K), rubidium (Rb), cesium (Cs), and any combination thereof.

Elements from Group IIA of the Periodic Table of Elements are typically referred to as alkaline earth metals. The alkaline earth metal may comprise an element, or any combination of elements, from Group IIA of the Periodic Table of Elements. The alkaline earth metal may comprise, for example, magnesium (Mg).

Elements from Groups IB-VIIIB of the Periodic Table of Elements are typically referred to as transition metals. The transition metal may comprise an element, or any combination of elements, from Groups IB-VIIIB of the Period Table of Elements. The transition metal may comprise, for example, cobalt (Co), manganese (Mn), zinc (Zn), yttrium (Y), titanium (Ti), and any combination thereof.

The non-transition metal may comprise, for example, aluminum (Al), gallium (Ga), germanium (Ge), indium (In), tin (Sn), and any combination thereof.

The alkali metal may be, for example, potassium (K). The chemical formula of the beta-delithiated layered nickel oxide may be, for example, $Li_xK_yNi_{1+a-z}M_zO_2 \cdot nH_2O$ where x is from about 0.02 to about 0.20; y is from about 0.03 to about 0.20; a is from about 0 to about 0.2; z is from about 0 to about 0.2; n is from about 0 to about 1. The chemical formula of the beta-delithiated layered nickel oxide may be, for example, $Li_{0.11}K_{0.11}NiO_2 \cdot 0.5H_2O$ or $Li_{0.06}K_{0.12}NiO_2 \cdot 0.53H_2O$.

The alkaline earth metal may be, for example, magnesium (Mg). The chemical formula of the beta-delithiated layered nickel oxide may be, for example, $Li_xK_yNi_{1+a-z}Mg_zO_2 \cdot nH_2O$ wherein x is from about 0.02 to about 0.2; y is from about 0.03 to about 0.2; a is from about 0 to about 0.2; z is from about 0 to about 0.2; and n is from about 0 to about 1. The chemical formula of the beta-delithiated layered nickel oxide may be, for example, $Li_{0.15}K_{0.10}Ni_{1.05}Mg_{0.04}O_2 \cdot 0.24H_2O$.

The transition metal may be, for example, cobalt (Co). The chemical formula of the beta-delithiated layered nickel oxide may be, for example, $Li_xK_yNi_{1+a-z}Co_zO_2 \cdot nH_2O$ wherein x is from about 0.02 to about 0.2; y is from about 0.03 to about 0.2; a is from about 0 to about 0.2; z is from about 0 to about 0.2; and n is from about 0 to about 1. The chemical formula of the beta-delithiated layered nickel oxide may be, for example, $Li_{0.04}K_{0.11}Ni_{0.97}Co_{0.03}O_2 \cdot nH_2O$.

The non-transition metal may be, for example, aluminum (Al). The chemical formula of the beta-delithiated layered nickel oxide may be, for example, $Li_xK_yNi_{1+a-z}Al_zO_2 \cdot nH_2O$ wherein x is from about 0.02 to about 0.2; y is from about 0.03 to about 0.2; a is from about 0 to about 0.2; z is from about 0 to about 0.2; and n is from about 0 to about 1. The chemical formula of the beta-delithiated layered nickel oxide may be, for example, $Li_{0.12}K_{0.09}Ni_{1.08}Al_{0.02}O_2 \cdot 0.18H_2O$.

The content of the alkali metal(s), alkaline earth metal(s), transition metal(s), and/or non-transition metal(s) within the beta-delithiated layered nickel oxide may be determined by any acceptable method known in the art. For example, the content of the alkali metal(s) and transition metal(s) within the beta-delithiated layered nickel oxide may be determined by inductively coupled plasma atomic emission (ICP-AE) spectroscopy and/or atomic absorption (AA) spectroscopy. ICP-AE and/or AA analyses may be completed, for example, using standard methods as described, for example, by J. R. Dean, *Practical Inductively Coupled Plasma Spectroscopy*, pp. 65-87 (2005) and B. Welz and M. B. Sperling, *Atomic Absorption Spectrometry*, pp. 221-294 ($3^{rd}$ ed. 1999). An Ultima 2 ICP spectrometer, available from HORIBA Scientific (Kyoto, Japan), may be used to complete ICP-AE analysis on a sample material, such as a beta-delithiated layered nickel oxide. ICP-AE analysis of the beta-delithiated layered nickel oxide can be performed at varying wavelengths depending upon the elements contained within the beta-delithiated layered nickel oxide.

The water content within the beta-delithiated layered nickel oxide may be determined by any acceptable method known in the art. For example, the water content within the beta-delithiated layered nickel oxide may be determined by thermogravimetric analysis (TGA). TGA determines, for example, the absorbed and adsorbed water of the sample material; the water content within the crystal lattice of the sample material; and the total water content within the sample material by measuring the change in weight of the sample as a function of increasing temperature. TGA is described, for example, by R. F. Speyer, *Thermal Analysis of Materials* (1994). A Q5000 analyzer, available from TA Instruments (Newcastle, Del., USA), may be used to complete TGA on a sample material, such as a beta-delithiated layered nickel oxide.

Powder X-ray diffraction (XRD) is an analytical technique that is used to characterize the crystal lattice structure of a sample material, such as a crystalline powder. XRD analysis of a crystalline sample material will result in a characteristic diffraction pattern consisting of peaks of varying intensities, widths, and diffraction angles (peak positions) corresponding to diffraction planes in the crystal structure of the sample material. XRD patterns can be measured with an X-ray diffractometer using $CuK_\alpha$ radiation by standard methods as is described, for example, by B. D. Cullity and S. R. Stock, *Elements of X-ray Diffraction* ($3^{rd}$ ed. 2001). A D-8 Advance X-ray diffractometer, available from Bruker Corporation (Madison, Wis., USA), may be used to complete powder XRD analysis on a sample material, such as a beta-delithiated layered nickel oxide.

The unit cell parameters, such as unit cell lengths and angles, of the sample material can be determined, for example, by Rietveld refinement of the XRD pattern. Rietveld refinement is described, for example, by H. M. Rietveld, *A Profile Refinement Method for Nuclear and Magnetic Structures*, 2 J. Appl. Cryst., pp. 65-71 (1969).

The crystallite size of the sample material can be determined by peak broadening of the XRD pattern of a sample material that contains a silicon (Si) standard. Peak broadening analysis may be completed, for example, by the single-peak Scherrer method or the Warren-Averbach method as is discussed, for example, by H. P. Klug and L. E. Alexander *X-ray Diffraction Procedures for Polycrystalline and Amorphous Materials*, pp. 618-694 (1974). The Warren-Averbach method may also be used to determine the residual strain and stress of the sample material.

The full width at half maximum (FWHM) can be used to characterize the relative sharpness, or broadness, of the lines in the diffraction pattern of the sample material. The FWHM can be determined by measuring the intensity of a peak; dividing the measured intensity by two to calculate half intensity (half height); and measuring the width in 2θ of the peak at the calculated half height.

The normalized intensity can be used, along with peak position, to compare the relative efficiency of diffraction associated with the particular diffraction planes within the crystal lattice of the sample material. The normalized intensity may be calculated for peaks within the same XRD pattern. All peaks of the XRD pattern may be normalized to the peak having the highest intensity (the reference peak). Normalization, which is reported in percent, occurs by dividing the intensity of the peak being normalized by the intensity of the reference peak and multiplying by 100. For example, the reference peak may have an intensity of 425 and the peak being normalized may have an intensity of 106. The normalized intensity of the peak is 25%, e.g., [(106/425)·100]. The reference peak will have a normalized intensity of 100%.

The resulting XRD pattern may be compared with known XRD patterns. The comparative XRD patterns may be generated from known sample materials. In addition, the resulting XRD pattern may be compared with known XRD patterns within, for example, the Powder Diffraction File (PDF) database, available from International Centre for Diffraction Data (Newton Square, Pa., USA), or the Inorganic Crystal Structure Database (ICSD), available from FIZ Karlsruhe (Eggenstein-Leopoldshafen, Germany). The comparison to known sample materials or PDF determines if the resulting XRD pattern of the sample material is distinct, similar, or equivalent to known XRD patterns of materials. Known XRD patterns within the PDF database for comparison to, for example, beta-delithiated layered nickel oxide include PDF #00-06-0141 for beta-nickel oxyhydroxide; PDF #00-00675 for gamma-nickel oxyhydroxide; PDF #00-059-0463 for nickel oxide; PDF #00-059-0463 for beta-nickel hydroxide; and PDF #00-036-0791 for potassium hydroxide.

The beta-delithiated layered nickel oxide may have a characteristic XRD pattern. The XRD pattern may include several peaks, or combination of peaks, that are indicative of the beta-delithiated layered nickel oxide. The XRD pattern may include characteristic FWHM values for the several peaks of the beta-delithiated layered nickel oxide. The XRD pattern may also include characteristic normalized intensities for the several peaks of the beta-delithiated layered nickel oxide.

The XRD pattern of the beta-delithiated layered nickel oxide may include a first peak. The first peak may have a peak position on the XRD pattern of from about 14.9°2θ to about 16.0°2θ. The first peak may be, for example, at about 15.4°2θ. The XRD pattern of the beta-delithiated layered nickel oxide may include a second peak. The second peak may have a peak position on the XRD pattern of from about 21.3°2θ to about 22.7°2θ. The second peak may be, for example, at about 22.1°2θ. The XRD pattern of the beta-delithiated layered nickel oxide may include a third peak. The third peak may have a peak position on the XRD pattern of from about 37.1°2θ to about 37.4°2θ. The third peak may be, for example, at about 37.3°2θ. The XRD pattern of the beta-delithiated layered nickel oxide may include a fourth peak. The fourth peak may have a peak position on the XRD pattern of from about 43.2°2θ to about 44.0°2θ. The fourth peak may be, for example, at about 43.6°2θ. The XRD pattern of the beta-delithiated layered nickel oxide may include a fifth peak. The fifth peak may have a peak position on the XRD pattern of from about 59.6°2θ to about 60.6°2θ. The fifth peak may be, for example, at about 60.1°2θ. The XRD pattern of the beta-delithiated layered nickel oxide may include a sixth peak. The sixth peak may have a peak position on the XRD pattern of from about 65.4°2θ to about 65.9°2θ. The sixth peak may be, for example, at about 65.7°2θ. The XRD pattern of the beta-delithiated layered nickel oxide may include a seventh peak. The seventh peak may have a peak position on the XRD pattern of from about 10.8°2θ to about 12.0°2θ. The seventh peak may be, for example, at about 11.2°2θ. The XRD pattern of the beta-delithiated layered nickel oxide may include an eighth peak. The eighth peak may have a peak position on the XRD pattern of from about 47.2°2θ to about 47.4°2θ. The eighth peak may be, for example, at about 47.3°2θ. The XRD pattern of the beta-delithiated layered nickel oxide may include a ninth peak. The ninth peak may have a peak position on the XRD pattern of from about 48.1°2θ to about 48.6°2θ. The ninth peak may be, for example, at about 48.3°2θ.

The first peak of the XRD pattern of the beta-delithiated layered nickel oxide may have a FWHM (FWHM). The FWHM of the first peak may be from about 1.01 to about 2.09. The FWHM of the first peak may be, for example, about 1.37. The second peak of the XRD pattern of the beta-delithiated layered nickel oxide may have a FWHM. The FWHM of the second peak may be from about 0.86 to about 1.95. The FWHM of the second peak may be, for example, about 1.37. The third peak of the XRD pattern of the beta-delithiated layered nickel oxide may have a FWHM. The FWHM of the third peak may be from about 0.23 to about 0.41. The FWHM of the third peak may be, for example, about 0.28. The fourth peak of the XRD pattern of the beta-delithiated layered nickel oxide may have a FWHM. The FWHM of the fourth peak may be from about 0.40 to about 0.75. The FWHM of the fourth peak may be, for example, about 0.60. The fifth peak of the XRD pattern of the beta-delithiated layered nickel oxide may have a FWHM. The FWHM of the fifth peak may be from about 0.57 to about 1.45. The FWHM of the fifth peak may be, for example, about 0.92. The sixth peak of the XRD pattern of the beta-delithiated layered nickel oxide may have a FWHM. The FWHM of the sixth peak may be from about 0.27 to about 0.53. The FWHM of the sixth peak may be, for example, about 0.36. The seventh peak of the XRD pattern of the beta-delithiated layered nickel oxide may have a FWHM. The FWHM of the seventh peak may be from about 0.56 to about 1.73. The FWHM of the seventh peak may be, for example, about 1.13. The eighth peak of the XRD pattern of the beta-delithiated layered nickel oxide may have a FWHM. The FWHM of the eighth peak may be from about 0.08 to about 0.21. The FWHM of the eighth peak may be, for example, about 0.15. The ninth peak of the XRD pattern of the beta-delithiated layered nickel oxide may have a FWHM. The FWHM of the ninth peak may be from about 0.33 to about 0.58. The FWHM of the ninth peak may be, for example, about 0.45.

The peaks of the XRD pattern of the beta-delithiated layered nickel oxide may be normalized. The peaks of the XRD pattern may be normalized, for example, to the third peak of the XRD pattern. The normalized intensity of the first peak of the XRD pattern may be from about 13% to about 37%. The normalized intensity of the first peak of the XRD pattern may be, for example, about 24%. The normalized intensity of the second peak of the XRD pattern may be from about 6% to about 16%. The normalized intensity of the second peak of the XRD pattern may be, for example, about 10%. The normalized intensity of the third peak of the XRD pattern may be, for example, 100%. The normalized intensity of the fourth peak of the XRD pattern may be from about 45% to about 73%. The normalized intensity of the fourth peak of the XRD pattern may be, for example, about 58%. The normalized intensity of the fifth peak of the XRD pattern may be from about 7% to about 17%. The normalized intensity of the fifth peak of the XRD pattern may be, for example, about 11%. The normalized intensity of the sixth peak of the XRD pattern may be from about 41% to about 61%. The normalized intensity of the sixth peak of the XRD pattern may be, for example, about 48%. The normalized intensity of the seventh peak of the XRD pattern may be from about 2% to about 18%. The normalized intensity of the seventh peak of the XRD pattern may be, for example, about 6%. The normalized intensity of the eighth peak of the XRD pattern may be from about 8% to about 20%. The normalized intensity of the eighth peak of the XRD pattern may be, for example, about 10%. The normalized intensity of the ninth peak of the XRD pattern may be from about 6% to about 20%. The normalized intensity of the ninth peak of the XRD pattern may be, for example, about 12%.

An electrochemically active material, such as a beta-delithiated layered nickel oxide, may produce gas, for example oxygen gas, when the material is placed in contact with an aqueous electrolyte. The rate of gas generation when an electrochemically active material is placed in contact with an electrolyte may be observed qualitatively and may be determined quantitatively.

The qualitative rate of gas generation (GER) of an electrochemically active material may be determined through visual observation. For example, a quantity of electrochemically active material, such as beta-delithiated layered nickel oxide, may be placed within a container, such as a Petri dish. A quantity of electrolyte, such as a nine normal (9N) aqueous solution of potassium hydroxide, may then be added to the Petri dish that includes the electrochemically active material. Gas bubbles may begin to form when the electrolyte contacts the electrochemically active material. The formation of gas bubbles may be, for example, slow, rapid, and, in some instances, violent. The visual formation of gas bubbles for one electrochemically active material may be qualitatively compared with one or more other electrochemically active materials. The beta-delithiated layered nickel oxide may exhibit a lower qualitative GER when compared to other electrochemically active materials having high oxidation states, such as a high oxidation state transition metal oxide, e.g., alpha-delithiated nickel oxide.

The quantitative rate of gas generation may be determined by a gas evolution rate (GER) monitor. For example, a quantity of electrochemically active material, such as beta-delithiated layered nickel oxide, may be mixed with a quantity of electrolyte, such as a nine normal (9N) aqueous solution of potassium hydroxide. The mixture may be placed within a container that may be sealed closed, such as a glass jar. The glass jar may then be sealed and may be stored at room conditions or at an elevated temperature, such as within an oven. A pressure sensor may be attached to, for example, the cap of the glass jar. The pressure sensor may monitor the change in gas pressure within the glass jar resulting from any gas that may be generated when the electrolyte contacts the electrochemically active material. A Series 27A pressure sensor, available from Valcom S.r.l. (Milan, Italy), may be a suitable pressure sensor. A data acquisition unit may be attached to the pressure sensor to record the change in gas pressure within the glass jar over time. A 34970A data acquisition/data logger switch unit, available from Agilent Technologies, Inc. (Santa Clara, Calif., USA), is a suitable data acquisition unit. The beta-delithiated layered nickel oxide may exhibit a lower quantitative GER when compared to other electrochemically active materials having high oxidation states, such as a high oxidation state transition metal oxide, e.g., alpha-delithiated nickel oxide.

The stability of an electrochemically active material, such as a beta-delithiated layered nickel oxide, may be evaluated using isothermal microcalorimetry (IMC). IMC measures and records the heat flow to or from a sample material resulting from a dynamic chemical and/or physical process over time. IMC also measures and records the cumulative amount of heat absorbed or generated by the chemical and/or physical process. IMC is described, for example, in M. E. Brown, *Handbook of Thermal Analysis and Calorimetry Volume* 1 *Principles and Practice* (1998). IMC measurements may be made and recorded when a quantity of electrochemically active material, such as a beta-delithiated layered nickel oxide, is placed into a sample holder, such as a plastic sample holder, along with an electrolyte, such as a nine normal (9N) aqueous potassium hydroxide electrolyte. The sample holder may be sealed and placed into a temperature-controlled bath, for example, at about 40° C. The reaction between, for example, the beta-delithiated layered nickel oxide and the electrolyte may be exothermic. The heat generation from the exothermic reaction process may be measured and recorded using, for example, a TAM III isothermal microcalorimeter, available from TA Instruments (Newcastle, Del., USA). The beta-delithiated layered nickel oxide may exhibit improved stability, e.g., lower heat generation, when compared to other electrochemically active materials having high oxidation states, such as a high oxidation state transition metal oxide, e.g., alpha-delithiated nickel oxide.

The cathode 12 may also include at least one or more additional electrochemically active cathode materials. The additional electrochemically active cathode material may include manganese oxide, manganese dioxide, electrolytic manganese dioxide (EMD), chemical manganese dioxide (CMD), high power electrolytic manganese dioxide (HP EMD), lambda manganese dioxide, gamma manganese dioxide, beta manganese dioxide, and mixtures thereof. Other electrochemically active cathode materials include, but are not limited to, silver oxide; nickel oxide; nickel oxyhydroxide; copper oxide; copper salts, such as copper iodate; bismuth oxide; high-valence nickel compound; oxygen; and mixtures thereof. The nickel oxide can include nickel hydroxide, nickel oxyhydroxide, cobalt oxyhydroxide-coated nickel oxyhydroxide, alpha-delithiated layered nickel oxide, and combinations thereof. The nickel hydroxide or oxyhydroxide can include beta-nickel oxyhydroxide, gamma-nickel oxyhydroxide, and/or intergrowths of beta-nickel oxyhydroxide and/or gamma-nickel oxyhydroxide. The cobalt oxyhydroxide-coated nickel oxyhydroxide can include cobalt oxyhydroxide-coated beta-nickel oxyhydroxide, cobalt oxyhydroxide-coated gamma-nickel oxyhydroxide, and/or cobalt oxyhydroxide-coated intergrowths of beta-nickel oxyhydroxide and gamma-nickel oxyhydroxide.

The cathode 12 may include a conductive additive, such as carbon, and a binder. The cathode 12 may also include other additives. The carbon may increase the conductivity of the cathode 12 by facilitating electron flow within the solid structure of the cathode 12. The carbon may be graphite, such as expanded graphite and natural graphite; graphene, single-walled nanotubes, multi-walled nanotubes, carbon fibers; carbon nanofibers; and mixtures thereof. It is preferred that the amount of carbon in the cathode is relatively low, e.g., less than about 12%, less than about 10%, less than about 9%, less than about 8%, less than about 6%, less than about 3.75%, or even less than about 3.5%, for example from about 2.0% to about 3.5%. The lower carbon level enables inclusion of a higher loading of electrochemically active cathode material within the cathode 12 without increasing the volume of the cathode 12 or reducing the void volume (which must be maintained at or above a certain level to prevent internal pressure from rising too high as gas is generated within the cell) within the battery 10. Suitable graphite for use within a battery may be, for example, BNB-90 and/or BNC-30, available from TIMCAL Carbon & Graphite (Bodio, Switzerland).

It is generally preferred that the cathode be substantially free of non-expanded graphite. While non-expanded graphite particles provide lubricity to the cathode pellet forming process, this type of graphite is significantly less conductive than expanded graphite, and thus it is necessary to use more non-expanded graphite in order to obtain the same cathode conductivity of a cathode containing expanded graphite. The cathode 12 may include low levels of non-expanded graphite. The inclusion of non-expanded graphite, however, may compromise the reduction in graphite concentration that can be obtained while maintaining an adequate level of cathode conductivity due to the lower conductivity of non-expanded graphite.

Examples of optional binders that may be used in the cathode 12 include polyethylene, polyacrylic acid, or a fluorocarbon resin, such as PVDF or PTFE. An optional binder for use within a battery may be, for example, COATHYLENE HA-1681, available from E. I. du Pont de Nemours and Company (Wilmington, Del., USA). Examples of other cathode additives are described in, for example, U.S. Pat. Nos. 5,698,315, 5,919,598, 5,997,775 and 7,351,499.

The amount of electrochemically active cathode material within the cathode 12 may be referred to as the cathode loading. The loading of the cathode 12 may vary depending upon the electrochemically active cathode material used within, and the size of, the battery 10. For example, a AA battery with a beta-delithiated layered nickel oxide may have a cathode loading of at least about 6 grams of beta-delithiated layered nickel oxide. The cathode loading may be, for example, at least about 7 grams of beta-delithiated layered nickel oxide. The cathode loading may be, for example, between about 7.2 grams to about 11.5 grams of beta-delithiated layered nickel oxide. The cathode loading may be from about 8 grams to about 10 grams of beta-delithiated layered nickel oxide. The cathode loading may be from about 8.5 grams to about 9.5 grams of beta-delithiated layered nickel oxide. The cathode loading may be from about 9.5 grams to about 11.5 grams of beta-delithiated layered nickel oxide. The cathode loading may be from about 10.4 grams to about 11.5 grams of beta-delithiated layered nickel oxide. For a AAA battery, the cathode loading may be at least about 1.4 grams of beta-delithiated layered nickel oxide. The cathode loading may be from about 1.4 grams to about 2.3 grams of beta-delithiated layered nickel oxide. The cathode loading may be from about 1.6 grams to about 2.1 grams of beta-delithiated layered nickel oxide. The cathode loading may be from about 1.7 grams to about 1.9 grams of beta-delithiated layered nickel oxide. For a AAAA battery, the cathode loading may be from about 0.7 grams to about 1.2 grams of beta-delithiated layered nickel oxide. For a C battery, the cathode loading may be from about 27.0 grams to about 40.0 grams, for example about 33.5 grams, of beta-delithiated layered nickel oxide. For a D battery, the cathode loading may be from about 60.0 grams to about 84.0 grams, for example about 72.0 grams, of beta-delithiated layered nickel oxide.

The cathode components, such as active cathode material(s), carbon particles, binder, and any other additives, may be combined with a liquid, such as an aqueous potassium hydroxide electrolyte, blended, and pressed into pellets for use in the assembly of the battery 10. For optimal cathode pellet processing, it is generally preferred that the cathode pellet have a moisture level in the range of about 2.5% to about 5%, more preferably about 2.8% to about 4.6%. The pellets, after being placed within the housing 18 during the assembly of the battery 10, are typically re-compacted to form a uniform cathode assembly within the housing 18.

The cathode 12 will have a porosity that may be calculated at the time of cathode manufacture. The porosity of the cathode 12 may be from about 20% to about 40%, between about 22% and about 35%, and, for example, about 26%. The porosity of the cathode 12 may be calculated at the time of manufacturing, for example after cathode pellet processing, since the porosity of the cathode 12 within the battery 10 may change over time due to, inter alia, cathode swelling associated with electrolyte wetting of the cathode and discharge of the battery 10. The porosity of the cathode 12 may be calculated as follows. The true density of each solid cathode component may be taken from a reference book, for example *Lange's Handbook of Chemistry* (16$^{th}$ ed. 2005). The solids weight of each of the cathode components are defined by the battery design. The solids weight of each cathode component may be divided by the true density of each cathode component to determine the cathode solids volume. The volume occupied by the cathode 12 within the battery 10 is defined, again, by the battery design. The volume occupied by the cathode 12 may be calculated by a computer-aided design (CAD) program. The porosity may be determined by the following formula:

$$\text{Cathode Porosity} = [1 - (\text{cathode solids volume} \div \text{cathode volume})] \times 100$$

For example, the cathode 12 of a AA battery may include about 9.0 grams of alpha-delithiated layered nickel oxide and about 0.90 grams of graphite (BNC-30) as solids within the cathode 12. The true densities of the alpha-delithiated layered nickel oxide and graphite may be, respectively, about 4.9 g/cm$^3$ and about 2.15 g/cm$^3$. Dividing the weight of the solids by the respective true densities yields a volume occupied by the alpha-delithiated layered nickel oxide of about 1.8 cm$^3$ and a volume occupied by the graphite of about 0.42 cm$^3$. The total solids volume is about 2.2 cm$^3$. The battery designer may select the volume occupied by the cathode 12 to be about 3.06 cm$^3$. Calculating the cathode porosity per the equation above [1−(2.2 cm$^3$÷3.06 cm$^3$)] yields a cathode porosity of about 0.28, or 28%.

The anode 14 can be formed of at least one electrochemically active anode material, a gelling agent, and minor amounts of additives, such as organic and/or inorganic gassing inhibitor. The electrochemically active anode material may include zinc; zinc oxide; zinc hydroxide; cadmium; iron; metal hydride, such as $AB_5(H)$, $AB_2(H)$, and $A_2B_7(H)$; alloys thereof; and mixtures thereof.

The amount of electrochemically active anode material within the anode 14 may be referred to as the anode loading. The loading of the anode 14 may vary depending upon the electrochemically active anode material used within, and the size of, the battery. For example, a AA battery with a zinc electrochemically active anode material may have an anode loading of at least about 3.3 grams of zinc. The anode loading may be, for example, at least about 3.5 grams, about 3.7 grams, about 3.9 grams, about 4.1 grams, about 4.3 grams, or about 4.5 grams of zinc. The anode loading may be from about 4.0 grams to about 5.2 grams of zinc. The anode loading may be from about 4.2 grams to about 5.0 grams of zinc. For example, a AAA battery with a zinc electrochemically active anode material may have an anode loading of at least about 1.8 grams of zinc. For example, the anode loading may be from about 1.8 grams to about 2.2 grams of zinc. The anode loading may be, for example, from about 1.9 grams to about 2.1 grams of zinc. For example, a AAAA battery with a zinc electrochemically active anode material may have an anode loading of at least about 0.6 grams of zinc. For example, the anode loading may be from about 0.7 grams to about 1.1 grams of zinc. For example, a C battery with a zinc electrochemically active anode material may have an anode loading of at least about 9.5 grams of zinc. For example, the anode loading may be from about 10.0 grams to about 19.0 grams of zinc. For example, a D battery with a zinc electrochemically active anode material may have an anode loading of at least about 30.0 grams of zinc. For example, the anode loading may be from about 30.0 grams to about 45.0 grams of zinc. The anode loading may be, for example, from about 33.0 grams to about 39.5 grams of zinc.

Examples of a gelling agent that may be used include a polyacrylic acid; a polyacrylic acid cross-linked with polyalkenyl ether of divinyl glycol; a grafted starch material; a salt of a polyacrylic acid; a carboxymethylcellulose; a salt of a carboxymethylcellulose (e.g., sodium carboxymethylcellulose); or combinations thereof. The anode 14 may include a gassing inhibitor that may include an inorganic material, such as bismuth, tin, or indium. Alternatively, the gassing inhibitor can include an organic compound, such as a phosphate ester, an ionic surfactant or a nonionic surfactant.

The electrolyte may be dispersed throughout the cathode 12, the anode 14, and the separator 16. The electrolyte comprises an ionically conductive component in an aqueous solution. The ionically conductive component may be a hydroxide. The hydroxide may be, for example, potassium hydroxide, cesium hydroxide, and mixtures thereof. The concentration of the ionically conductive component may be selected depending on the battery design and its desired performance. An aqueous alkaline electrolyte may include a hydroxide, as the ionically conductive component, in a solution with water. The concentration of the hydroxide within the electrolyte may be from about 0.20 to about 0.40, or from about 20% to about 40%, on a weight basis of the total electrolyte within the battery 10. For example, the hydroxide concentration of the electrolyte may be from about 0.25 to about 0.32, or from about 25% to about 32%, on a weight basis of the total electrolyte within the battery 10. The aqueous alkaline electrolyte may also include zinc oxide (ZnO). The ZnO may serve to suppress zinc corrosion within the anode. The concentration of ZnO included within the electrolyte may be less than about 5% by weight of the total electrolyte within the battery 10. The ZnO concentration, for example, may be from about 1% by weight to about 3% by weight of the total electrolyte within the battery 10.

The total weight of the aqueous alkaline electrolyte within a AA alkaline battery, for example, may be from about 3.0 grams to about 4.4 grams. The total weight of the electrolyte within a AA battery preferably may be, for example, from about 3.3 grams to about 3.8 grams. The total weight of the electrolyte within a AA battery may be, for example, from about 3.4 grams to about 3.65 grams. The total weight of the aqueous alkaline electrolyte within a AAA alkaline battery, for example, may be from about 1.0 grams to about 2.0 grams. The total weight of the electrolyte within a AAA battery may be, for example, from about 1.2 grams to about 1.8 grams. The total weight of the electrolyte within a AAA battery may be, for example, from about 1.4 grams to about 1.6 grams. The total weight of the electrolyte within a AAAA battery may be from about 0.68 grams to about 0.78 grams, for example, from about 0.70 grams to about 0.75 grams. The total weight of the electrolyte within a C battery may be from about 12.3 grams to about 14.1 grams, for example, from about 12.6 grams to about 13.6 grams. The total weight of the electrolyte within a D battery may be from about 26.5 grams to about 30.6 grams, for example, from about 27.3 grams to about 29.5 grams.

The separator 16 comprises a material that is wettable or wetted by the electrolyte. A material is said to be wetted by a liquid when the contact angle between the liquid and the surface of the material is less than 90° or when the liquid tends to spread spontaneously across the surface of the material; both conditions normally coexist. The separator 16 may comprise a single layer, or multiple layers, of woven or nonwoven paper or fabric. The separator 16 may include a layer of, for example, cellophane combined with a layer of non-woven material. The separator 16 also can include an additional layer of non-woven material. The separator 16 may also be formed in situ within the battery 10. U.S. Pat. No. 6,514,637, for example, discloses such separator materials, and potentially suitable methods of their application. The separator material may be thin. The separator 16, for example, may have a dry material thickness of less than 250 micrometers (microns). The separator 16 may have a dry material thickness from about 50 microns to about 175 microns. The separator 16 may have a dry material thickness from about 70 microns to about 160 microns. The separator 16 may have a basis weight of about 40 g/m² or less. The separator 16 may have a basis weight from about 15 g/m² to about 40 g/m². The separator 16 may have a basis weight from from about 20 g/m² to about 30 g/m². The separator 16 may have an air permeability value. The separator 16 may have an air permeability value as defined in International Organization for Standardization (ISO) Standard 2965. The air permeability value of the separator 16 may be from about 2000 cm³/cm²·min @ 1 kPa to about 5000 cm³/cm²·min @ 1 kPa. The air permeability value of the separator 16 may be from about 3000 cm³/cm²·min @ 1 kPa to about 4000 cm³/cm²·min @ 1 kPa. The air permeability value of the separator 16 may be from about 3500 cm³/cm²·min @ 1 kPa to about 3800 cm³/cm²·min @ 1 kPa.

The current collector 20 may be made into any suitable shape for the particular battery design by any known methods within the art. The current collector 20 may have, for example, a nail-like shape. The current collector 20 may have a columnar body and a head located at one end of the columnar body. The current collector 20 may be made of metal, e.g., zinc, copper, brass, silver, or any other suitable material. The current collector 20 may be optionally plated with tin, zinc, bismuth, indium, or another suitable material presenting a low electrical-contact resistance between the current collector 20 and, for example, the anode 14. The plating material may also exhibit an ability to suppress gas formation when the current collector 20 is contacted by the anode 14.

The seal 22 may be prepared by injection molding a polymer, such as polyamide, polypropylene, polyetherurethane, or the like; a polymer composite; and mixtures thereof into a shape with predetermined dimensions. The seal 22 may be made from, for example, Nylon 6,6; Nylon 6,10; Nylon 6,12; Nylon 11; polypropylene; polyetherurethane; co-polymers; composites; and mixtures thereof. Exemplary injection molding methods include both the cold runner method and the hot runner method. The seal 22 may contain other known functional materials such as a plasticizer, a crystalline nucleating agent, an antioxidant, a mold release agent, a lubricant, and an antistatic agent. The seal 22 may also be coated with a sealant. The seal 22 may be moisturized prior to use within the battery 10. The seal 22, for example, may have a moisture content of from about 1.0 weight percent to about 9.0 weight percent depending upon the seal material. The current collector 20 may be inserted into and through the seal 22.

The end cap 24 may be formed in any shape sufficient to close the respective battery. The end cap 24 may have, for example, a cylindrical or prismatic shape. The end cap 24 may be formed by pressing a material into the desired shape with suitable dimensions. The end cap 24 may be made from any suitable material that will conduct electrons during the discharge of the battery 10. The end cap 24 may be made from, for example, nickel-plated steel or tin-plated steel. The end cap 24 may be electrically connected to the current collector 20. The end cap 24 may, for example, make electrical connection to the current collector 20 by being welded to the current collector 20. The end cap 24 may also include one or more apertures, such as holes, for venting any gas pressure that may build up under the end cap 24 during a gassing event within the battery 10, for example, during deep discharge or reversal of the battery 10 within a device, that may lead to rupturing of the vent.

The battery 10 including a cathode 12 including beta-delithiated layered nickel oxide may have an open-circuit voltage (OCV) that is measured in volts. The battery 10 may have an OCV from about 1.70 V to about 1.85 V. The battery 10 may have an OCV, for example, at about 1.78 V.

Batteries including beta-delithiated layered nickel oxide electrochemically active cathode materials of the present invention may have improved discharge performance for low, mid, and high drain discharge rates than, for example, batteries including high-oxidation state transition metal oxide electrochemically active cathode materials. Batteries including beta-delithiated layered nickel oxide electrochemically active cathode materials of the present invention may have lower closed circuit voltages than, for example, batteries including high-oxidation state transition metal oxide electrochemically active cathode materials. Batteries including beta-delithiated layered nickel oxide electrochemically active cathode materials of the present invention may have lower gas evolution than, for example, batteries including high-oxidation state transition metal oxide electrochemically active cathode materials. Batteries including beta-delithiated layered nickel oxide electrochemically active cathode materials of the present invention may have greater cathode structural integrity, continuity, and leakage characteristics than, for example, batteries including high-oxidation state transition metal oxide electrochemically active cathode materials. The beta-delithiated layered nickel oxide electrochemically active cathode materials of the present invention may consume less water, resulting in less cathode swelling and unfavorable water balancing, when incorporated within a battery than, for example, high-oxidation state transition metal oxide electrochemically active cathode materials incorporated within a battery.

Figure 2:
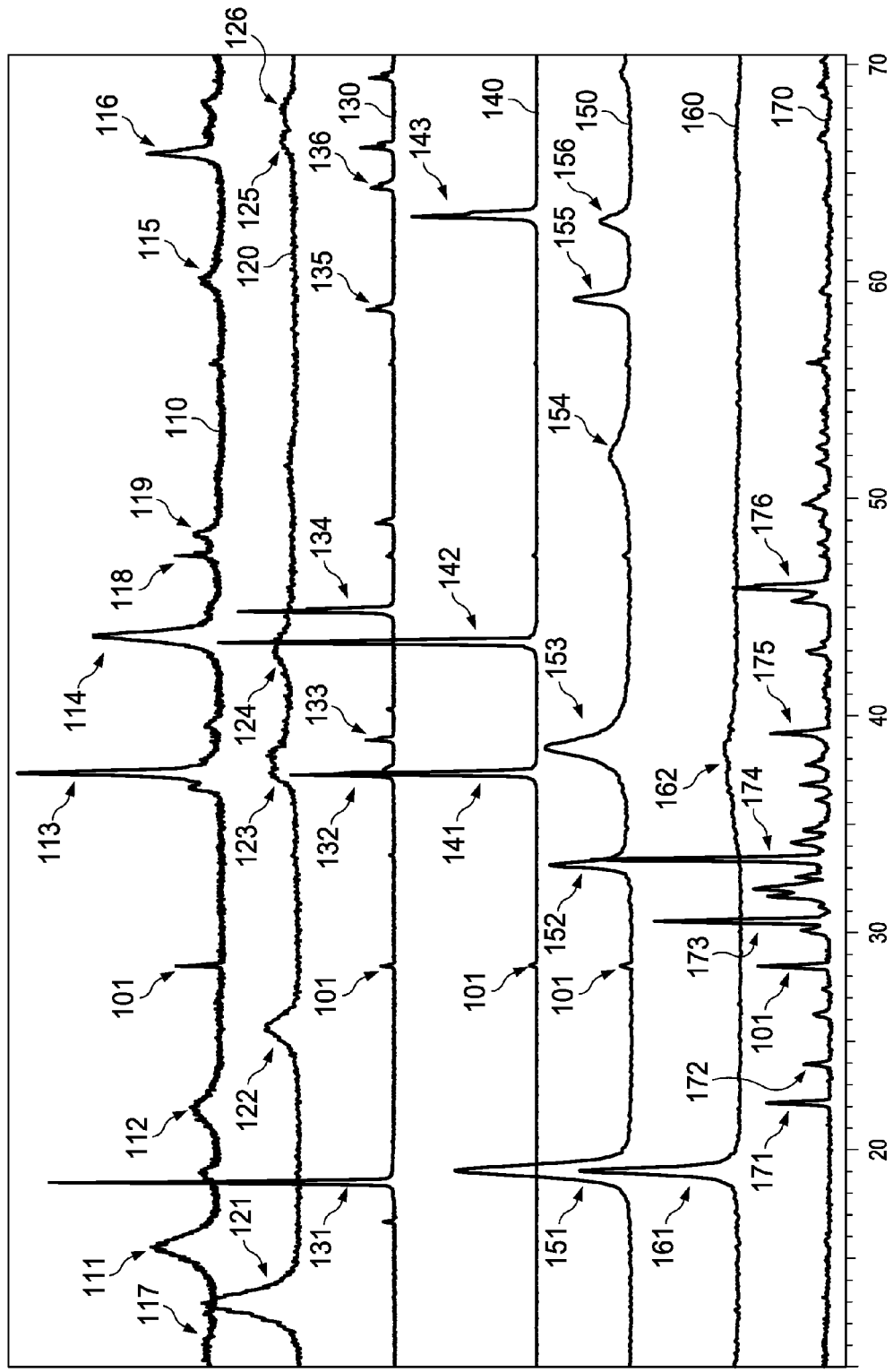
FIG. 2 includes a powder X-ray diffraction pattern for an embodiment of the beta delithiated layered nickel oxide electrochemically active cathode material of the present invention along with powder X-ray diffraction patterns for other materials.

Referring to FIG. 2, the XRD patterns of several sample materials are shown. An exemplary XRD pattern of a beta-delithiated layered nickel oxide 110 ($Li_{0.06}K_{0.12}NiO_2 \cdot 0.53H_2O$) of the present invention is included within FIG. 2. The exemplary XRD pattern of the beta-delithiated layered nickel oxide 110 includes a first peak at about 15.6°2θ (111); a second peak at about 21.9°2θ (112); a third peak at about 37.3°2θ (113); a fourth peak at about 43.6°2θ (114); a fifth peak at about 59.9°2θ (115); and a sixth peak at about 65.8°2θ (116). The exemplary XRD pattern of the beta-delithiated layered nickel oxide 110 also includes a seventh peak at about 11.2°2θ (117); a eighth peak at about 47.3°2θ (118); and a ninth peak at about 48.3°2θ (119).

Still referring to FIG. 2, an exemplary XRD pattern of gamma-nickel oxyhydroxide 120 (γ-NiOOH) is shown. The XRD pattern of gamma-nickel oxyhydroxide 120 includes a first peak at about 12.8°2θ (121); a second peak at about 25.5°2θ (122); a third peak at about 37.8°2θ (123); a fourth peak at about 42.9°2θ (124); a fifth peak at about 66.3°2θ (125); and a sixth peak at about 67.7°2θ (126). The XRD pattern of the beta-delithiated layered nickel oxide differs from the XRD pattern of gamma-nickel oxyhydroxide. For example, the XRD pattern of the beta-delithiated layered nickel oxide includes, inter alia, distinct peaks within the XRD pattern at about 15.6°2θ (111); at about 21.9°2θ (112); and at about 59.9°2θ (115). The XRD pattern of gamma-nickel oxyhydroxide does not include such peaks. In addition, the XRD pattern of the beta-delithiated layered nickel oxide includes, inter alia, distinct peaks within the XRD pattern at about 11.2°2θ (117); at about 47.3°2θ (118); and at about 48.3°2θ (119). The XRD pattern of gamma-nickel oxyhydroxide does not include such peaks.

Still referring to FIG. 2, an exemplary XRD pattern of an alpha-delithiated layered nickel oxide 130 ($Li_{0.06}NiO_2$) is shown. The exemplary XRD pattern of the alpha-delithiated layered nickel oxide 130 includes a first peak at about 18.5°2θ (131); a second peak at about 37.2°2θ (132); a third peak at about 38.8°2θ (133); a fourth peak at about 44.9°2θ (134); a fifth peak at about 58.6°2θ (135); and a sixth peak at about 64.1°2θ (136). The XRD pattern of the beta-delithiated layered nickel oxide differs from the XRD pattern of the alpha-delithiated layered nickel oxide. For example, the XRD pattern of the beta-delithiated layered nickel oxide includes, inter alia, distinct peaks within the XRD pattern at about 15.6°2θ (111); at about 21.9°2θ (112); and at about 43.6°2θ (114). The XRD pattern of the alpha-delithiated layered nickel oxide does not include such a peak. In addition, the XRD pattern of the beta-delithiated layered nickel oxide includes, inter alia, distinct peaks within the XRD pattern at about 11.2°2θ (117). The XRD pattern of the alpha-delithiated layered nickel oxide does not include such a peak.

Still referring to FIG. 2, an exemplary XRD pattern of nickel oxide 140 (NiO) is shown. The XRD pattern of nickel oxide 140 includes a first peak at about 37.2°2θ (141); a second peak at about 43.3°2θ (142); and a third peak at about 62.9°2θ (143). The XRD pattern of the beta-delithiated layered nickel oxide differs from the XRD pattern of nickel oxide. For example, the XRD pattern of the beta-delithiated layered nickel oxide includes, inter alia, distinct peaks within the XRD pattern at about 15.6°2θ (111); at about 21.9°2θ (112); at about 59.9°2θ (115); and at about 65.8°2θ (116). The XRD pattern of nickel oxide does not include such peaks. In addition, the XRD pattern of the beta-delithiated layered nickel oxide includes, inter alia, distinct peaks within the XRD pattern at about 11.2°2θ (117); at about 47.3°2θ (118); and at about 48.3°2θ (119). The XRD pattern of nickel oxide does not include such peaks.

Still referring to FIG. 2, an exemplary XRD pattern of beta-nickel hydroxide 150 (β-Ni(OH)$_2$) is shown. The XRD pattern of beta-nickel hydroxide 150 includes a first peak at about 19.2°2θ (151); a second peak at about 33.1°2θ (152); a third peak at about 38.5°2θ (153); a fourth peak at about 52.2°2θ (154); a fifth peak at about 59.2°2θ (155); and a sixth peak at about 62.8°2θ (156). The XRD pattern of the beta-delithiated layered nickel oxide differs from the XRD pattern of beta-nickel hydroxide. For example, the XRD pattern of the beta-delithiated layered nickel oxide includes, inter alia, distinct peaks within the XRD pattern at about 15.6°2θ (111); at about 21.9°2θ (112); at about 43.6°2θ (114); and at about 65.8°2θ (116). The XRD pattern of beta-nickel hydroxide does not include such peaks. In addition, the XRD pattern of the beta-delithiated layered nickel oxide includes, inter alia, distinct peaks within the XRD pattern at about 11.2°2θ (117); at about 47.3°2θ (118); and at about 48.3°2θ (119). The XRD pattern of beta-nickel hydroxide does not include such peaks.

Still referring to FIG. 2, an exemplary XRD pattern of beta-nickel oxyhydroxide 160 (β-NiOOH) is shown. The XRD pattern of beta-nickel oxyhydroxide 160 includes a first peak at about 19.1°2θ (161) and a second peak at about 37.9°2θ (162). The XRD pattern of the beta-delithiated layered nickel oxide differs from the XRD pattern of beta-nickel oxyhydroxide. For example, the XRD pattern of the beta-delithiated layered nickel oxide includes, inter alia, distinct peaks within the XRD pattern at about 15.6°2θ (111); at about 21.9°2θ (112); at about 43.6°2θ (114); at about 59.9°2θ (115); and at about 65.8°2θ (116). The XRD pattern of beta-nickel oxyhydroxide does not include such peaks. In addition, the XRD pattern of the beta-delithiated layered nickel oxide includes, inter alia, distinct peaks within the XRD pattern at about 11.2°2θ (117); at about 47.3°2θ (118); and at about 48.3°2θ (119). The XRD pattern of beta-nickel oxyhydroxide does not include such peaks.

Still referring to FIG. 2, an exemplary XRD pattern of potassium hydroxide 170 (KOH). The XRD pattern of potassium hydroxide 170 includes a first peak at about 22.1°2θ (171); a second peak at about 28.4°2θ (172); a third peak at about 30.5°2θ (173); a fourth peak at about 33.3°2θ (174); a fifth peak at about 39.1°2θ (175); and a sixth peak at about 45.8°2θ (176). The XRD pattern of the beta-delithiated layered nickel oxide differs from the XRD pattern of potassium hydroxide. For example, the XRD pattern of the beta-delithiated layered nickel oxide includes, inter alia, distinct peaks within the XRD pattern at about 15.6°2θ (111); at about 37.3°2θ (113); at about 43.6°2θ (114); at about 59.9°2θ (115); and at about 65.8°2θ (116). The XRD pattern of potassium hydroxide does not include such peaks. In addition, the XRD pattern of the beta-delithiated layered nickel oxide includes, inter alia, distinct peaks within the XRD pattern at about 11.2°2θ (117). The XRD pattern of potassium hydroxide does not include such peaks.

Still referring to FIG. 2, the XRD patterns of the beta-delithiated layered nickel oxide 110; the alpha-delithiated layered nickel oxide 130; nickel oxide 140; beta-nickel hydroxide 150; and potassium hydroxide 170 include a peak at about 28.5°2θ (101) that is indicative of the NIST 640d silicon standard. The silicon standard is used for 2θ diffraction angle calibration.

Figure 3:
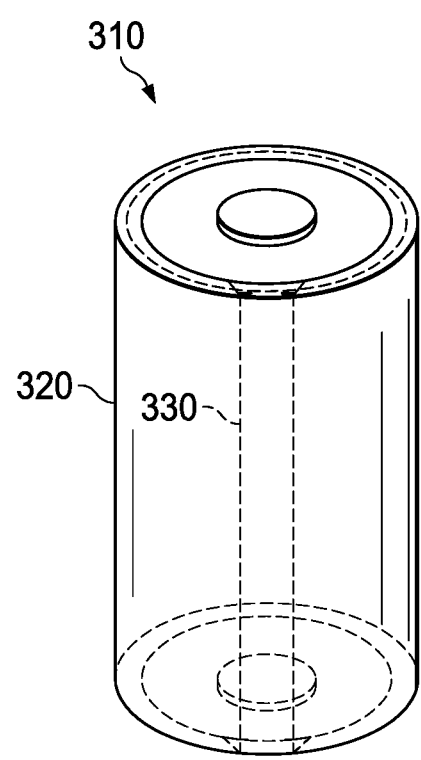
FIG. 3 is a perspective view of a primary alkaline battery of the present invention including a voltage indicator.

Referring to FIG. 3, a battery 310 including a label 320 that has an indicator, or tester, 330 incorporated within the label 320 to determine, for example, the voltage, capacity, state of charge, and/or power of the battery 310 is shown. The label 320 may be a laminated multi-layer film with a transparent or translucent layer bearing the label graphics and text. The label 320 may be made from polyvinyl chloride (PVC), polyethylene terephthalate (PET), and other similar polymer materials. The tester 330 may include, for example, a thermochromic or an electrochromic indicator. In a thermochromic battery tester, the indicator may be placed in electrical contact with the housing and the end cap the battery 310. The consumer activates the indicator by manually depressing a switch located within an electrical circuit included within the tester 330. Once the switch is depressed, the consumer has connected an anode of the battery 310, via the end cap, to a cathode of the battery 310, via the housing, through the thermochromic tester. The thermochromic tester may include a silver conductor that has a variable width so that the resistance of the conductor also varies along its length. The current generates heat that changes the color of a thermochromic ink display that is over the silver conductor as the current travels through the silver conductor. The tester 330 may be arranged as a gauge to indicate, for example, the relative capacity of the battery 310. The higher the current the more heat is generated and the more the gauge will change to indicate that the battery 310 is good.

Experimental Testing

Elemental Analysis Via ICP-AE

Elemental analysis via ICP-AE is completed on a sample of electrochemically active material to determine the elemental content of the sample material. ICP-AE analysis is completed using the HORIBA Scientific Ultima 2 ICP spectrometer. ICP-AE analysis is completed by placing a sample solution within the spectrometer. The sample solution is prepared in a manner that is dependent upon the element(s) that are desired to be analyzed.

For elemental analysis, a first solution is made by adding approximately 0.15 grams of the sample material to about 20 mL of an eight normal (8N) solution of nitric acid ($HNO_3$). The first solution is heated, at about 210° C., until almost all the liquid is evaporated off. The first solution is then allowed to cool to between about 100° C. to about 150° C. A second solution is formed by adding about 10 mL of concentrated hydrochloric acid (HCl) to the first solution after the first solution has cooled. The second solution is heated, at about 210° C., until almost all the liquid is evaporated off. The second solution is then allowed to cool. A third solution is formed by adding about 10 mL of concentrated HCl to the second solution after the second solution has cooled to between about 100° C. to about 150° C. The third solution is heated, at about 210° C., until almost all liquid is evaporated off. The third solution is then placed into an oven at about 110° C. for one hour. After storage within the oven, the third solution is allowed to cool. A fourth solution is formed by adding 5 mL concentrated HCl to the third solution. The fourth solution is heated, to about 210° C., until the sample material is dissolved within the fourth solution. The fourth solution is allowed to cool. A fifth solution is formed by transferring the fourth solution to a 100 mL volumetric flask and adding distilled water, up to the 100 mL graduation mark of the volumetric flask, to the fourth solution. The fifth solution is used for elemental analysis of lithium (Li), potassium (K), and rubidium (Rb) using the ICP-AE spectrometer. A sixth solution is formed by transferring one mL of the fifth solution into a 50 mL centrifuge tube; adding about 2.5 mL of concentrated HCl to the centrifuge tube; adding distilled water to the centrifuge tube so that the total weight of the sixth solution is 50 grams; and mixing the components of the centrifuge tube. The sixth solution is used for elemental analysis of nickel (Ni) using the ICP-AE spectrometer.

ICP-AE analysis of the beta-delithiated layered nickel oxide is performed at various wavelengths specific to potassium (K), lithium (Li), nickel (Ni), and rubidium (Rb). For example, the wavelength ($\lambda$) for analysis of potassium (K) within a beta-delithiated layered nickel oxide may be set at about 766 nm. For example, the wavelength ($\lambda$) for analysis of lithium (Li) within a beta-delithiated layered nickel oxide may be set at about 610 nm. For example, the wavelength ($\lambda$) for analysis of nickel (Ni) within a beta-delithiated layered nickel oxide may be set at about 231 nm. For example, the wavelength ($\lambda$) for analysis of rubidium (Rb) within a beta-delithiated layered nickel oxide may be set at about 780 nm.

Table 1 below includes the elemental analysis via ICP-AE results for the alpha-delithiated layered nickel oxide (Material A) and the beta-delithiated layered nickel oxide (Material B). The weight percent of lithium (Li), nickel (Ni), and potassium (K) within the sample material is reported. The elemental analysis via ICP-AE data is used to determine the chemical composition of Material A and Material B. The elemental analysis via ICP-AE is also used to confirm that Material A and Material B do not have undesirable side products or decomposition products within their respective chemical compositions.

Water Content Via Thermogravimetric Analysis (TGA)

Water content via TGA is completed on a sample of electrochemically active material to determine the absorbed/adsorbed water, the crystalline water, and total water content within the sample material. TGA analysis is completed using the TA Instruments Q5000 analyzer.

TGA analysis is conducted by placing about 34 mg of sample onto the TGA sample holder. The sample material is heated at a rate of 5° C./min to a temperature of about 800° C. The heating of the sample occurs in the presence of nitrogen that is flowing at a rate of, for example, about 25 mL/min. The sample weight is measured as a function of time and temperature.

Table 1 includes the water content that is measured via TGA for the alpha-delithiated layered nickel oxide (Material A) and the beta-delithiated layered nickel oxide (Material B). The water content that is measured via TGA is used to determine the lattice water present in the chemical compositions of Material A and Material B. The water content that is measured via TGA is also used to determine the water adsorbed to the surface of Material A and Material B and to confirm that no excess water is present in the respective materials.

Qualitative Gas Evolution Rate (GER) Analysis

Qualitative gas generation rate (GER) analysis is completed on a sample of electrochemically active material to qualitatively determine the rate of gas evolution. The qualitative GER analysis is completed through visual observation. The qualitative GER analysis includes placing about one gram of sample material in a Petri dish and adding about 0.5 grams of nine normal (9N) aqueous potassium hydroxide electrolyte to the sample material within the Petri dish. The qualitative GER is then visually observed and recorded.

Table 1 includes the qualitative GER results for the alpha-delithiated layered nickel oxide (Material A) and the beta-delithiated layered nickel oxide (Material B). The alpha-delithiated layered nickel oxide (Material A) exhibits a high qualitative GER. The beta-delithiated layered nickel oxide (Material B) exhibits a low qualitative GER.

Quantitative Gas Evolution Rate (GER) Analysis

Quantitative gas evolution rate (GER) analysis is completed on a sample of electrochemically active material to quantitatively determine the rate of gas evolution. The quantitative GER analysis is completed using the Valcom Series 27A pressure sensor attached to the cap of a sealable, 100 mL glass jar. The Agilent 34970A Data acquisition unit is attached to the pressure sensor. A mixture of about 2.5 grams of sample material and about 1.5 grams of nine normal (9N) aqueous potassium hydroxide electrolyte is placed within the glass jar. The glass jar is then sealed with the cap. The sealed glass jar is then placed into an oven at a temperature of about 40° C. The pressure of any gas that is generated over time by the sample material in contact with the electrolyte is recorded by the Agilent data logger.

Table 1 includes the quantitative GER results for the alpha-delithiated layered nickel oxide (Material A) and the beta-delithiated layered nickel oxide (Material B). The beta-delithiated layered nickel oxide (Material B) initially produces gas. After approximately 20 hours of measurement, Material B generates about 65 mBar of gas. After approximately 40 hours of measurement, Material B generates about 69 mBar of gas. After approximately 80 hours of measurement, Material B generates about 74 mBar of gas.

The alpha-delithiated layered nickel oxide (Material A) initially produces a greater quantity of gas, and at a faster rate, than Material B. After approximately 20 hours of measurement, Material A generates about 137 mBar of gas. After approximately 40 hours of measurement, Material B generates about 150 mBar of gas. After approximately 80 hours of measurement, Material B generates about 169 mBar of gas. The gas that is generated by Material A, for each measurement point, is greater than two times the amount of gas that is generated by Material B at the same measurement point.

Stability Determination Via Isothermal Microcalorimetry (IMC) Analysis

Stability determination via IMC is performed on a sample of electrochemically active material to determine the amount, and rate, of heat that is generated by the sample material in contact with an electrolyte. The stability determination is completed using the TA Instruments TAM III isothermal microcalorimeter. A mixture is prepared by adding about 1.5 grams of nine normal (9N) aqueous potassium hydroxide electrolyte to about 2.5 grams of the sample material within a glass beaker. About one gram of the mixture is transferred into a 1.5 mL plastic vial. The plastic vial containing the mixture is placed into a TA Instruments 4 mL glass ampoule. The glass ampoule is then sealed and is placed into the isothermal microcalorimeter at a temperature of about 40° C. The heat that is generated by the sample material versus time is then measured and is recorded.

Table 1 includes the stability determination via IMC results for the alpha-delithiated layered nickel oxide (Material A) and the beta-delithiated layered nickel oxide (Material B). Both Material A and Material B initially generate heat, respectively, about $7 \times 10^{-3}$ W/g and about $1 \times 10^{-3}$ W/g respectively. The heat being produced by Material A stabilizes, and remains relatively constant, at about $1 \times 10^{-3}$ W/g after about two hours of measurement. At this same point in time, the heat being produced by Material B, however, has decreased to about $7 \times 10^{-5}$ W/g. The heat being produced by Material A, about $1 \times 10^{-3}$ W/g, and Material B, about $6 \times 10^{-5}$ W/g, remains relatively constant after about one day of measurement. The heat being produced by Material A, about $4 \times 10^{-5}$ W/g, and Material B, about $2 \times 10^{-5}$ W/g, decreases after about three days of measurement.

Material B, after an initial spike in heat generation, generates less heat while in the presence of nine normal (9N) aqueous potassium hydroxide electrolyte than Material A. Material B is thus more stable than Material A when in the presence of 9N aqueous potassium hydroxide electrolyte. The stability measurements confirm the relative reactivity of Material A and Material B seen in the qualitative and quantitative GER experiments discussed above.

TABLE 1

ICP-AE, TGA, GER, AND IMC DATA FOR MATERIAL A AND MATERIAL B.

| FEATURE | MATERIAL A ($Li_{0.06}NiO_2$) | MATERIAL B ($Li_{0.06}K_{0.12}NiO_2 \cdot 0.53H_2O$) |
|---|---|---|
| ICP-AE | | |
| Lithium (weight percent) | 0.55% | 0.49% |
| Nickel (weight percent) | 72.0% | 65.2% |
| Potassium (weight percent) | 0 | 5.2% |
| TGA | | |
| Absorbed/Adsorbed Water (weight percent) | — | 4 |
| Crystalline Water (weigth percent) | — | 10 |
| Total Water (weight percent) | — | 14 |
| Qualitative GER | High | Low |
| Quantitative GER | | |
| Gas Pressure @ 20 hrs (mBar) | 137 | 65 |
| Gas Pressure @ 40 hrs (mBar) | 150 | 69 |
| Gas Pressure @ 80 hrs (mBar) | 160 | 74 |
| IMC | | |
| Initial (W/g) | $7 \times 10^{-3}$ | $1 \times 10^{-3}$ |
| 2 hours (W/g) | $1 \times 10^{-3}$ | $7 \times 10^{-5}$ |
| 1 day (W/g) | $1 \times 10^{-3}$ | $6 \times 10^{-5}$ |
| 3 days (W/g) | $4 \times 10^{-5}$ | $2 \times 10^{-5}$ |

Powder X-Ray Diffraction Analysis

Powder X-ray diffraction (XRD) analysis is performed on a crystalline powder sample to determine the characteristic XRD diffraction pattern of the crystalline powder sample. XRD analysis is completed using the Bruker D-8 Advance X-ray diffractometer. XRD analysis is performed on a beta-delithiated layered nickel oxide as well as several comparative samples. About one gram to about two grams of the sample material is placed within the Bruker sample holder. The sample holder including the sample material is then placed into the rotating sample stage of the X-ray diffractometer and the sample material is then irradiated by the $CuK_\alpha$ X-ray source of the diffractometer. The X-rays that are diffracted are measured by a Sol-x detector, available from Baltic Scientific Instruments (Riga, Latvia). The XRD pattern of each sample is then collected using a 0.02° step size at 2 seconds/step from 10°2θ to 80°2θ using Diffrac-plus software supplied by Bruker Corporation. The XRD pattern for the sample material is then analyzed using EVA and Topas data analysis software packages, both available from Bruker Corporation. The XRD pattern of the sample material is compared to reference XRD patterns that are measured for known materials.

Table 2 summarizes the sample and known materials analyzed and the characteristic peaks within the XRD pattern of each of the materials.

TABLE 2

SUMMARY OF THE MAIN DIFFRACTION PEAKS IN THE XRD PATTERNS OF THE SAMPLE AND KNOWN MATERIALS.

| SAMPLE MATERIAL | FIRST PEAK | SECOND PEAK | THIRD PEAK | FOURTH PEAK | FIFTH PEAK | SIXTH PEAK |
|---|---|---|---|---|---|---|
| β-Delithiated Layered Nickel Oxide ($Li_{0.06}K_{0.12}NiO_2 \cdot 0.53H_2O$) | 15.6 | 21.9 | 37.3 | 43.6 | 59.9 | 65.5 |
| α-Delithiated Layered Nickel Oxide ($Li_{0.06}NiO_2$) | 18.5 | 37.2 | 38.8 | 44.9 | 58.6 | 64.1 |
| β-Nickel Oxyhydroxide | 18.35 | 37.27 | — | — | — | — |
| γ-Nickel Oxyhydroxide | 12.8 | 25.6 | 37.9 | 43.2 | 66.3 | 67.7 |
| Nickel Oxide | 37.2 | 43.3 | 62.9 | — | — | — |
| β-Nickel Hydroxide | 19.2 | 33.1 | 38.5 | 52.2 | 59.2 | 62.8 |
| Potassium Hydroxide | 22.1 | 28.4 | 30.5 | 33.3 | 39.1 | 45.8 |

Performance Testing of Assembled AAA Alkaline Primary Batteries

An exemplary AAA battery, referred to as Battery A in Table 3 below, is assembled. Battery A includes an anode, a cathode, a separator, and an aqueous alkaline electrolyte within a cylindrical housing. The anode includes an anode slurry containing 1.96 grams of zinc; 0.875 grams of a potassium hydroxide alkaline electrolyte with about 30% KOH by weight and 2% ZnO by weight dissolved in water; 0.02 grams of polyacrylic acid gellant; and 0.01 grams of corrosion inhibitor. The cathode includes a blend of alpha-delithiated layered nickel oxide, graphite, and potassium hydroxide aqueous electrolyte solution. The cathode has a loading of 3.35 grams of alpha-delithiated layered nickel oxide, a loading of 0.40 grams Timcal BNC-30 graphite, and 0.21 grams of electrolyte. The separator is interposed between the anode and cathode. The anode, cathode, and separator are inserted into the cylindrical housing. The housing is then sealed to complete the battery assembly process. Battery A then undergoes aging and performance testing as is described below.

An experimental AAA battery, referred to as Battery B in Table 3 below, is assembled. Battery B includes an anode, a cathode, a separator, and an aqueous alkaline electrolyte within a cylindrical housing. The anode includes an anode slurry containing 1.96 grams of zinc; 0.875 grams of a potassium hydroxide alkaline electrolyte with about 30% KOH by weight and 2% ZnO by weight dissolved in water; 0.02 grams of polyacrylic acid gellant; and 0.01 grams of corrosion inhibitor. The cathode includes a blend of beta-delithiated layered nickel oxide, graphite, and potassium hydroxide aqueous electrolyte solution. The cathode includes a loading of 3.35 grams of a beta-delithiated layered nickel oxide, a loading of 0.40 grams Timcal BNC-30 graphite, and 0.21 grams of electrolyte. A separator is interposed between the anode and cathode. The anode, cathode, and separator are inserted into the cylindrical housing. The housing is then sealed to complete the battery assembly process. Battery B then undergoes aging and performance testing as is described below.

TABLE 3

THE DESIGN FEATURES OF AAA BATTERY A AND BATTERY B.

| FEATURE | BATTERY A | BATTERY B |
|---|---|---|
| Anode | | |
| Zinc Weight | 1.96 g | 1.96 g |
| Gelling Agent Weight | 0.02 g | 0.02 g |
| Corrosion Inhibitor Weight | 0.01 g | 0.01 g |
| Cathode | | |
| Active Weight | 3.35 g ($Li_{0.06}NiO_2$) | 3.35 g ($Li_{0.06}K_{0.12}NiO_2 \cdot 0.53H_2O$) |
| Graphite Weight | 0.40 g | 0.40 g |
| Complete Cell | | |
| Total KOH Weight | 0.56 g | 0.56 g |
| Total Water Weight | 1.19 g | 1.19 g |
| Total ZnO Weight | 0.03 g | 0.03 g |

Performance testing includes discharge performance testing that may be referred to as the Power Signature Test. The Power Signature Test protocol includes sequentially applying a high rate, a medium rate, and a low rate discharge regime to the battery, with recovery, or rest periods in between each of the discharge regimes. The high rate discharge regime is first applied to the battery. The high rate discharge regime includes applying a constant power drain of 0.5 watts to the battery until the cutoff voltage of 0.9 volts is reached. The battery is then allowed to recover for a period of 4 hours. The medium rate discharge regime is then applied to the battery. The medium rate discharge regime includes applying a constant power drain of 0.125 watts to the battery until the cutoff voltage of 0.9 volts is reached. The battery is then allowed to recover for a period of 4 hours. The low rate discharge regime is then applied to the battery. The low rate discharge regime includes applying a constant power drain of 0.025 watts to the battery until the cutoff voltage of 0.9 volts is reached. The measured capacity of the battery, in ampere hours (Ah), is reported for each individual discharge regime. In addition, the cumulative measured capacity for the battery for all the discharge regimes, in ampere hours (Ah), is also reported.

Performance testing includes discharge performance testing that may be referred to as the 30 Milliampere Continuous Discharge Test (30 mA Continuous). The 30 mA Continuous protocol includes applying a constant current drain of 30 mA to the battery until the cutoff voltage of 0.9 volts is reached. The measured total capacity of the battery is reported in ampere hours (Ah). The 30 mA Continuous Discharge Test is a low rate discharge test.

Prior to performance testing, the battery is aged for four days at about 20° C. After four days of aging, the Open Circuit Voltage (OCV) of the battery is measured. The OCV of the battery is measured by placing, for example, a voltmeter across the positive and negative terminals of the battery. The measured open circuit voltage (V) of the battery is reported. The OCV test does not consume any capacity from the battery.

After four days of aging, the Short Circuit Current (SCC) of the battery is measured. The SCC protocol includes applying a constant current of six amperes (Amps) for a period of 0.1 seconds to the battery. The voltage of the battery is measured while under the drain of six Amps and is reported. The battery would have a measured voltage of zero (0) volts if the battery is completely short circuited. The current at which the battery would short circuit is calculated by extrapolating the line between the coordinates of the measured OCV and the measured voltage under drain to the intercept of the x-axis on an x,y plot of current versus voltage. The measured OCV has an (x,y) coordinate of (0 Amp, OCV). The measured voltage under drain has an (x,y) coordinate of (6 Amp, Load Voltage). The SSC test does not consume significant capacity from the battery due to the extremely short duration of the test. The SSC is calculated by the following formula:

$$SSC\ (Amps) = [(OCV \cdot 6\ Amp)/(OCV - Load\ Voltage)]$$

Performance Testing Results

Battery A and Battery B undergo OCV, SSC, Power Signature, and 30 mA Continuous performance testing. Table 4 below summarizes the performance testing results. The Difference column of Table 4 includes the percentage difference in performance for Battery B with respect to Battery A.

Battery B that includes beta-delithiated layered nickel oxide provides improved overall performance when compared with Battery A that includes alpha-delithiated layered nickel oxide. The OCV of Battery B is slightly reduced when compared with Battery A. The lower OCV of Battery B reduces the likelihood of damage when Battery B is incorporated in an electrical device than the higher OCV of Battery A. The SSC of Battery B is significantly higher than Battery A. The higher SSC of Battery B is indicative of a greater ability to carry higher discharge currents than Battery A. The capacity of Battery B under the high discharge rate and medium discharge rate regimes of the Power Signature Test is significantly higher than Battery A. The higher discharge capacity of Battery B is indicative of a greater ability to provide improved performance under these discharge conditions than Battery A. The capacity of Battery B under the low rate discharge regime of the Power Signature Test is lower than Battery A. The lower discharge capacity of Battery B is due to the greater consumption of capacity under the high and the medium discharge regimes of the Power Signature Test than Battery A. The cumulative discharge capacity of Battery B is greater than Battery A. The greater cumulative discharge capacity of Battery B is indicative of a higher total deliverable capacity than Battery A. The capacity of Battery B under the 30 mA Continuous Test is also higher than Battery A. The higher discharge capacity of Battery B is indicative of a greater ability to provide improved performance under low rate discharge conditions than Battery A.

TABLE 4

PERFORMANCE TESTING RESULTS AND COMPARISONS FOR BATTERY A AND BATTERY B.

| TEST PROTOCOL | BATTERY A | BATTERY B | % DIFFERENCE |
|---|---|---|---|
| OCV (V) | 1.827 | 1.791 | −3% |
| SSC (Amps) | 12.3 | 16.2 | +32% |
| Power Signature: 0.5 Watt Capacity (Ah) | 0.375 | 0.75 | +100% |
| Power Signature: 0.125 Watt Capacity (Ah) | 0.275 | 0.375 | +36% |
| Power Signature: 0.025 Watt Capacity (Ah) | 0.425 | 0.035 | −92% |
| Power Signature: Total Capacity (Ah) | 1.075 | 1.16 | +8% |
| 30 mA Continuous (Ah) | 0.95 | 1.16 | +22% |

Performance Testing of Assembled AA Alkaline Primary Batteries

An exemplary AA battery, referred to as Battery C in Table 5 below, is assembled. Battery C includes an anode, a cathode, a separator, and an aqueous alkaline electrolyte within a cylindrical housing. The anode includes an anode slurry containing 5.04 grams of zinc; 2.32 grams of a potassium hydroxide alkaline electrolyte with about 28% KOH by weight and 1.8% ZnO by weight dissolved in water; 0.04 grams of polyacrylic acid gellant; and 0.01 grams of corrosion inhibitor. The cathode includes a blend of alpha-delithiated layered nickel oxide, graphite, and potassium hydroxide aqueous electrolyte solution. The cathode includes a loading of 8.99 grams of alpha-delithiated layered nickel oxide, a loading of 0.92 grams Timcal BNC-30 graphite, and 0.49 grams of electrolyte. A separator is interposed between the anode and cathode. The anode, cathode, and separator are inserted into a cylindrical housing. The housing is then sealed to complete the battery assembly process. Battery C then undergoes aging and performance testing as is described below.

An experimental AA battery, referred to as Battery D in Table 5 below, is assembled. Battery D includes an anode, a cathode, a separator, and an electrolyte within a cylindrical housing. The anode includes an anode slurry containing 4.83 grams of zinc; 2.287 grams of a potassium hydroxide alkaline electrolyte with about 28% KOH by weight and 1.8% by ZnO weight dissolved in water; 0.04 grams of polyacrylic acid gellant; and 0.01 grams of corrosion inhibitor. The cathode includes a blend of beta-delithiated layered nickel oxide, graphite, and potassium hydroxide aqueous electrolyte solution. The cathode includes a loading of 8.99 grams of a beta-delithiated layered nickel oxide, a loading of 0.92 grams Timcal BNC-30 graphite, and 0.49 grams of electrolyte. A separator is interposed between the anode and cathode. The anode, cathode, and separator are inserted into a cylindrical housing. The housing is then sealed to complete the battery assembly process. Battery D then undergoes aging and performance testing as is described below.

TABLE 5

THE DESIGN FEATURES OF AA BATTERY C AND BATTERY D.

| FEATURE | BATTERY C | BATTERY D |
|---|---|---|
| Anode | | |
| Zinc Weight | 5.04 g | 4.83 g |
| Gelling Agent Weight | 0.04 g | 0.04 g |
| Corrosion Inhibitor Weight | 0.01 g | 0.01 g |
| Cathode | | |
| Active Weight | 8.99 g ($Li_{0.06}NiO_2$) | 8.99 g ($Li_{0.06}K_{0.12}NiO_2 \cdot 0.53H_2O$) |
| Graphite Weight | 0.92 g | 0.92 g |
| Complete Cell | | |
| Total KOH Weight | 1.10 g | 1.07 g |
| Total Water Weight | 2.87 g | 2.80 g |
| Total ZnO Weight | 0.07 g | 0.07 g |

Performance testing includes OCV, SSC, and 30 mA Continuous testing according to the protocols that are described within the section Performance Testing of Assembled AAA Alkaline Primary Batteries above. The battery is aged for four days at about 20° C. prior to performance testing.

Performance Testing Results

Battery C and Battery D undergo OCV, SSC, and 30 mA Continuous performance testing. Table 6 below summarizes the performance testing results. The % Difference column of Table 6 includes the percentage difference in performance for Battery D with respect to Battery C.

Battery D that includes beta-delithiated layered nickel oxide provides improved overall performance when compared with Battery C that includes alpha-delithiated layered nickel oxide. The OCV of Battery D is slightly reduced when compared with Battery C. The lower OCV of Battery D reduces the likelihood of damage when Battery D is incorporated in an electrical device than the higher OCV of Battery C. The SSC of Battery D is significantly higher than Battery C. The higher SSC of Battery D is indicative of a greater ability to carry higher discharge currents than Battery C. The capacity of Battery D under the 30 mA Continuous Test is also higher than Battery C. The higher discharge capacity of Battery D is indicative of a greater ability to provide improved performance under low rate discharge conditions than Battery C.

TABLE 6

PERFORMANCE TESTING RESULTS AND COMPARISONS FOR BATTERY C AND BATTERY D.

| TEST PROTOCOL | BATTERY C | BATTERY D | % DIFFERENCE |
|---|---|---|---|
| OCV (V) | 1.81 | 1.79 | −10% |
| SSC (Amps) | 23.3 | 24.7 | +6% |
| 30 mA Continuous (Ah) | 1.23 | 3.1 | +152% |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. An electrochemically active cathode material comprising a beta-delithiated layered nickel oxide, the beta-delithiated layered nickel oxide having an X-ray diffraction pattern comprising a peak from about 14.9°2θ to about 16.0°2θ and a peak from about 10.8°2θ to about 12.0°2θ.

2. The electrochemically active cathode material of claim 1, the X-ray diffraction pattern further comprising a peak from about 21.3°2θ to about 22.7°2θ; a peak from about 37.1°2θ to about 37.4°2θ; a peak from about 43.2°2θ to about 44.0°2θ; a peak from about 59.6°2θ to about 60.6°2θ; and a peak from about 65.4°2θ to about 65.9°2θ.

3. The electrochemically active cathode material of claim 2, the X-ray diffraction pattern further comprising a peak from about 48.1°2θ to about 48.6°2θ.

4. The electrochemically active cathode material of claim 1, the X-ray diffraction pattern comprising a peak at about 15.4°2θ and a peak at about 11.2°2θ.

5. The electrochemically active cathode material of claim 2, the X-ray diffraction pattern comprising a peak at about 22.1°2θ; a peak at about 37.3°2θ; a peak at about 43.6°2θ; a peak at about 60.1°2θ; and a peak at about 65.7°2θ.

6. The electrochemically active cathode material of claim 5, the X-ray diffraction pattern further comprising a peak at about 48.3°2θ.

7. The electrochemically active cathode material of claim 1, the peak from about 14.9°2θ to about 16.0°2θ having a FWHM from about having a FWHM from about 1.01 to about 2.09 and the peak from about 10.8°2θ to about 12.0°2θ having a FWHM from about 0.56 to about 1.73.

8. The electrochemically active cathode material of claim 1, the X-ray diffraction pattern further comprising a peak from about 21.3°2θ to about 22.7°2θ having a FWHM from about 0.86 to about 1.95; a peak from about 37.1°2θ to about 37.4°2θ having a FWHM from about 0.23 to about 0.41; a peak from about 43.2°2θ to about 44.0°2θ having a FWHM from about 0.40 to about 0.75; a peak from about 59.6°2θ to about 60.6°2θ having a FWHM from about 0.57 to about 1.45; and a peak from about 65.4°2θ to about 65.9°2θ having a FWHM from about 0.27 to about 0.53.

9. The electrochemically active cathode material of claim 8, the X-ray diffraction pattern further comprising a peak from about 48.1°2θ to about 48.6°2θ having a FWHM from about 0.33 to about 0.58.

10. A battery comprising:
a cathode comprising a conductive additive and an electrochemically active cathode material, the electrochemically active cathode material comprising a beta-delithiated layered nickel oxide;
an anode comprising an electrochemically active anode material, the electrochemically active anode material comprising zinc;
a separator between said cathode and said anode; and
an electrolyte;
wherein the beta-delithiated layered nickel oxide has an X-ray diffraction pattern comprising a peak from about 14.9°2θ to about 16.0°2θ and a peak from about 10.8°2θ to about 12.0°2θ.

11. The battery of claim 10, wherein the X-ray diffraction pattern of the beta-delithiated layered nickel oxide further comprises a peak at about 21.3°2θ to about 22.7°2θ; a peak from about 37.1°2θ to about 37.4°2θ; a peak from about 43.2°2θ to about 44.0°2θ; a peak from about 59.6°2θ to about 60.6°2θ; and a peak from about 65.4°2θ to about 65.9°2θ.

12. The battery of claim 10, the peak from about 14.9°2θ to about 16.0°2θ having a FWHM from about 1.01 to about 2.09 and the peak from about 10.8°2θ to about 12.0°2θ having a FWHM from about 0.56 to about 1.73.

13. The battery of claim 10, wherein the X-ray diffraction pattern of the beta-delithiated layered nickel oxide further comprises a peak from about 21.3°2θ to about 22.7°2θ having a FWHM from about 0.86 to about 1.95; a peak from about 37.1°2θ to about 37.4°2θ having a FWHM from about 0.23 to about 0.41; a peak from about 43.2°2θ to about 44.0°2θ having a FWHM from about 0.40 to about 0.75; a peak from about 59.6°2θ to about 60.6°2θ having a FWHM from about 0.57 to about 1.45; and a peak from about 65.4°2θ to about 65.9°2θ having a FWHM from about 0.27 to about 0.53.

14. The battery of claim 10, wherein the battery further comprises:
a housing, the housing comprising an outer surface; and
a label, the label comprising a voltage tester;
wherein the label is affixed to the outer surface of the housing.

15. The electrochemically active material of claim 1, the beta-delithiated layered nickel oxide having the formula: $Li_xA_yNi_{1+a-z}M_zO_2 \cdot nH_2O$
where x is from about 0.02 to about 0.20;
y is from about 0.03 to about 0.20;
a is from about 0 to about 0.2;
z is from about 0 to about 0.2;
n is from about 0 to about 1;
A comprises an alkali metal; and
M comprises an alkaline earth metal, a transition metal, a non-transition metal, and any combination thereof.

16. The electrochemically active material of claim 15, wherein A comprises potassium.

17. The electrochemically active material of claim 15, wherein a is from about 0.09 to about 0.10.

18. The electrochemically active material of claim 15, wherein the beta-delithiated layered nickel oxide comprises water such that n is greater than 0.

* * * * *